United States Patent [19]

Quesinberry

[11] 4,148,029
[45] Apr. 3, 1979

[54] SYSTEM FOR ESTIMATING ACCELERATION OF MANEUVERING TARGETS

[75] Inventor: Elmen C. Quesinberry, Severna Park, Md.

[73] Assignee: Westinghouse Electric Corp., Pittsburgh, Pa.

[21] Appl. No.: 731,872

[22] Filed: Oct. 13, 1976

[51] Int. Cl.$^2$ .............................................. G01S 7/44
[52] U.S. Cl. ................................... 343/9; 343/5 DP; 343/7.4
[58] Field of Search .......................... 343/5 DP, 7.4, 9

[56] References Cited

U.S. PATENT DOCUMENTS

| 3,793,634 | 2/1974 | Heller et al. | 343/5 DP X |
| 3,821,738 | 6/1974 | Quesinberry et al. | 343/9 X |
| 3,924,235 | 12/1975 | Heller et al. | 343/5 DP X |
| 3,935,572 | 1/1976 | Broniwitz et al. | 343/5 DP X |

Primary Examiner—T. H. Tubbesing
Attorney, Agent, or Firm—H. W. Patterson

[57] ABSTRACT

A radar system of the type utilizing an optimal estimator to process raw range and angle track data for driving a radar antenna, where the tracking computations, range rate, and angular rate of the range vector are utilized in estimating the target velocity vector and the target acceleration vector. The attenuation inherent in the practical estimation of target acceleration is effectively removed for severely maneuvering targets by a compensating system that provides an attenuation factor, and multiplies the estimated acceleration output signal by the reciprocal of such factor. The implement control system is governed by the estimated target position and estimated target velocity from the estimator, and the modified acceleration signal of the compensating system.

10 Claims, 15 Drawing Figures

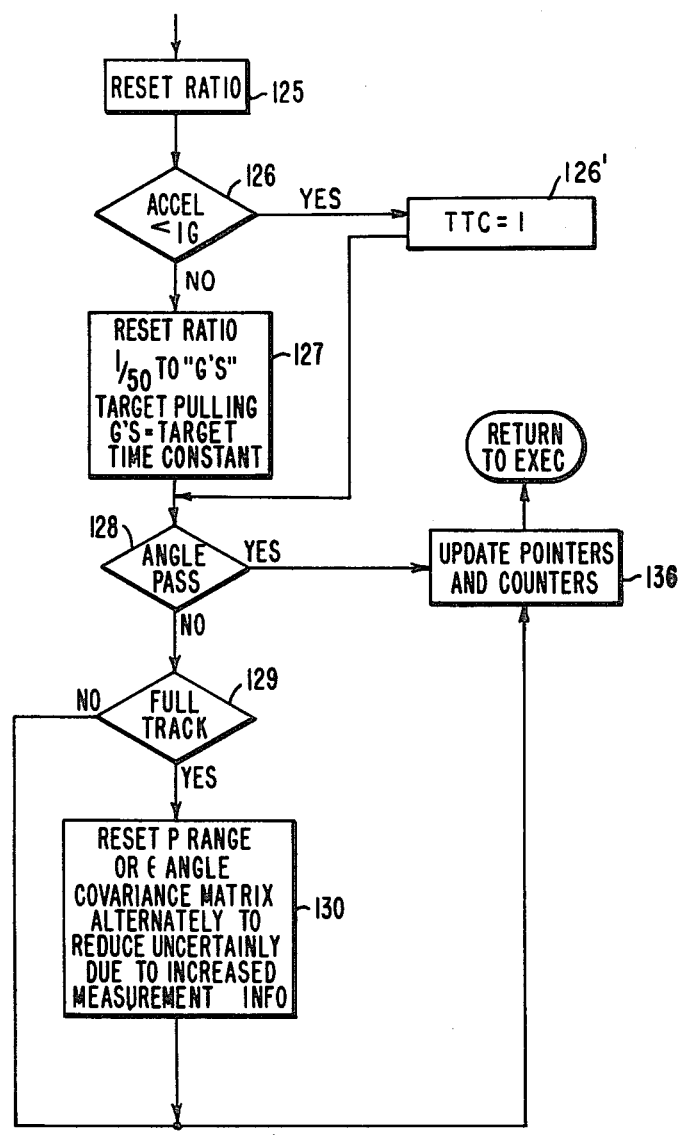

SYSTEM FOR ESTIMATING ACCELERATION OF MANEUVERING TARGETS

BACKGROUND OF THE INVENTION

The present invention relates to a radar system which predicts the position, velocity, and acceleration of a severely maneuvering target for controlling the aiming of a implement, such as a weapon or camera, for example, at such target.

In a typical radar system, pulses are transmitted through an antenna at a predetermined repetition rate toward a target. The time of reception of the transmitted pulses by the antenna provides information as to the range or distance of the target from the antenna (R) and the rate of change of the range of the target (R). The velocity of the target ($V_T$) may be determined by combining ownship velocity with the doppler frequency shift between the transmitted pulse and the received echo pulse.

For a radar system mounted on an aircraft, there are a number of different Cartesian coordinate systems involved in the tracking of a target and the pointing of a weapon or camera at a target. An earth or geographic coordinate system extends along north, east, and down axes (N, E and D) respectively. An aircraft coordinate system extends along dead-ahead, right, and down axes (X, Y and Z) from the nose of the aircraft, respectively; and a line of sight or antenna coordinate system extends along axes in the direction that the antenna is pointing (i), orthogonally to the right (j), and down from such direction (k). These coordinate systems may be utilized in the tracking operation of the antenna and the pointing of a weapon or camera at a target. Thus, vector information can be obtained relative to such coordinates to track the target with the antenna; and also point an implement at such target. For example, signals may be generated that are representative of the attitude of the aircraft relative to the horizon; that is, nose up or nose down, as the case may be, as well as signals representative of the velocity of the aircraft in its true direction. These signals, as well as tracking error signals of the antenna are input to and operated upon by a digital computer that calculates the various output signals for positioning the antenna to maintain its track on the target; and in some applications to operate a weapon control unit for directing a weapon or camera at a maneuvering target. In the mechanization of the system, a high speed digital computer may be utilized that operates upon the input signals every 0.02 seconds, for example. The new range measurement signals may be read by the computer every 0.04 of a second and the angle measurements are operated upon by the computer every 0.04 seconds during alternate cycles of calculation. Each calculation may be output to the antenna at a rate of one every 0.005 of a second for controlling its position, for example, and the output signals to control the weapon control system may occur anywhere from 0.005 to 0.04 seconds, for example, as desired.

From the input information, estimates of the target position are generated at predetermined fractions of a second; and such target position estimate signals, which are determined from the last estimated position, target velocity and target acceleration estimation signals, are then utilized to direct toward, or maintain the antenna on the moving target; and, may be also utilized to control the pointing of an implement at the target.

An optimal estimating system that is well suited for program implementation in a high speed digital computer is the estimator known as a Kalman filter. The Kalman filter is well known in the literature and may be defined as an optimal recursive filter that is based on state space and time domain formulations.

In such estimator, the current calculated estimate of acceleration is determined by conventional calculations of a predetermined number of past acceleration estimates. For example, assuming that there are fifty estimates of acceleration calculated evey second and a time constant TTC of three seconds is utilized, then one hundred fifty of such estimations are utilized in calculating the present or current acceleration estimation of the target. It is well known that acceleration and deceleration builds up and decays more or less rapidly for different types of targets; and that different time constants TTC may be used for different targets. Thus, for relatively slowly accelerating targets a TTC of ten or fifteen seconds may be used to obtain the required estimated accuracy. For rapidly accelerating targets, a shorter TTC is required in the neighborhood of one to three seconds, for example in order to provide an accurate estimation. In each such current estimate of acceleration, each one of the previous calculations utilized, are decremented a predetermined amount. For example, for a three second time constant with fifty calculations per second, the 150 calculations are decremented by 1/150th of the gain factor of the estimator, which of course provides less weight to each previous calculation of acceleration until each calculation is decremented to zero.

High speed aircraft having the capability of rapid turns and thus rapid changes in acceleration has rendered the optimal estimation of position, particularly for weapon control, difficult. In the generation of the acceleration output estimation signal, it has been found that it is necessary to decrement or bleed off the previous calculations of acceleration at a relatively rapid rate in order to provide for an accurate estimate. Such decrementing or bleeding of the signal may be accomplished every 0.02 seconds, for example, as previously mentioned, by multiplying each previously calculated or obsolete estimate of acceleration by $1-(0.02/TTC)$, where TTC is a target time constant, and 0.02 corresponds to the time interval since the last calculated acceleration estimate. For example, if the last calculated acceleration were 4 G's, the time constant TTC might be 4, for 5 G's, the TTC would be 5, and so on. Since the resulting number is less than 1, each subsequent calculation would tend to drive the previous acceleration estimate to zero. In some instances, particularly for utilizing the acceleration estimate for weapon control, the output signals may be updated more or less frequently than the output signals to the antenna. The penalty exacted for decrementing or decaying the old or obsolete acceleration estimates relatively rapidly is that the magnitude of the acceleration estimate for severely maneuvering targets never achieves full value. Typically, 50 to 80% of full value is achieved. If the decrementing of the acceleration estimate is decreased, so as to extend the time constant TTC to 10 or 20 seconds, for example, the full value or magnitude of the acceleration estimate may be achieved but the accuracy of the system would be further decreased in attempting to track targets having a rapid change of acceleration.

Thus, it is desirable to provide an improved radar system where the estimated acceleration output signal is corrected to provide for a more accurate estimation of position for severely maneuvering targets.

SUMMARY OF THE INVENTION

Broadly, the present invention relates to a system and method which compensates for the attenuation of estimated acceleration by multiplying the attenuated signal by the reciprocal of the final value of the unit step response.

In accordance with the present invention a radar system that includes an estimator for providing signals corresponding to the relative position, velocity, and acceleration of a rapidly moving target for implement aiming or other purpose includes means to modify each of the calculated estimations of acceleration in order to more accurately estimate the position of severely maneuvering targets. The unmodified estimated position, velocity, and acceleration signals are obtained during each calculation by weighting with a separate gain factor for each such position, velocity, and acceleration signals, which gain factor represents a predetermined portion of the error between each measured position, velocity, and acceleration signal and its corresponding estimated signal. In obtaining each new estimate of acceleration, the system includes means whereby a selected number of prior acceleration estimates are combined and decremented by a signal that is a function of the total time or number of previous estimations that are used in calculating each new estimated acceleration signal. Each new estimated acceleration signal is modified by multiplying it with a value that corresponds to $1 + W_V/(W_A \ TTC)$, where $W_V$ is the estimator gain estimation factor for the velocity estimation signal, $W_A$ is the estimator gain factor for acceleration and TTC is the time constant relating to the selected number of previously generated estimates used in calculating the present acceleration estimate.

BRIEF DESCRIPTION OF THE DRAWINGS

FIGS. 10A–10C illustrate a flow chart of the estimator routine according to one embodiment of the invention.

DESCRIPTION OF THE PREFERRED EMBODIMENT

Figure 1:
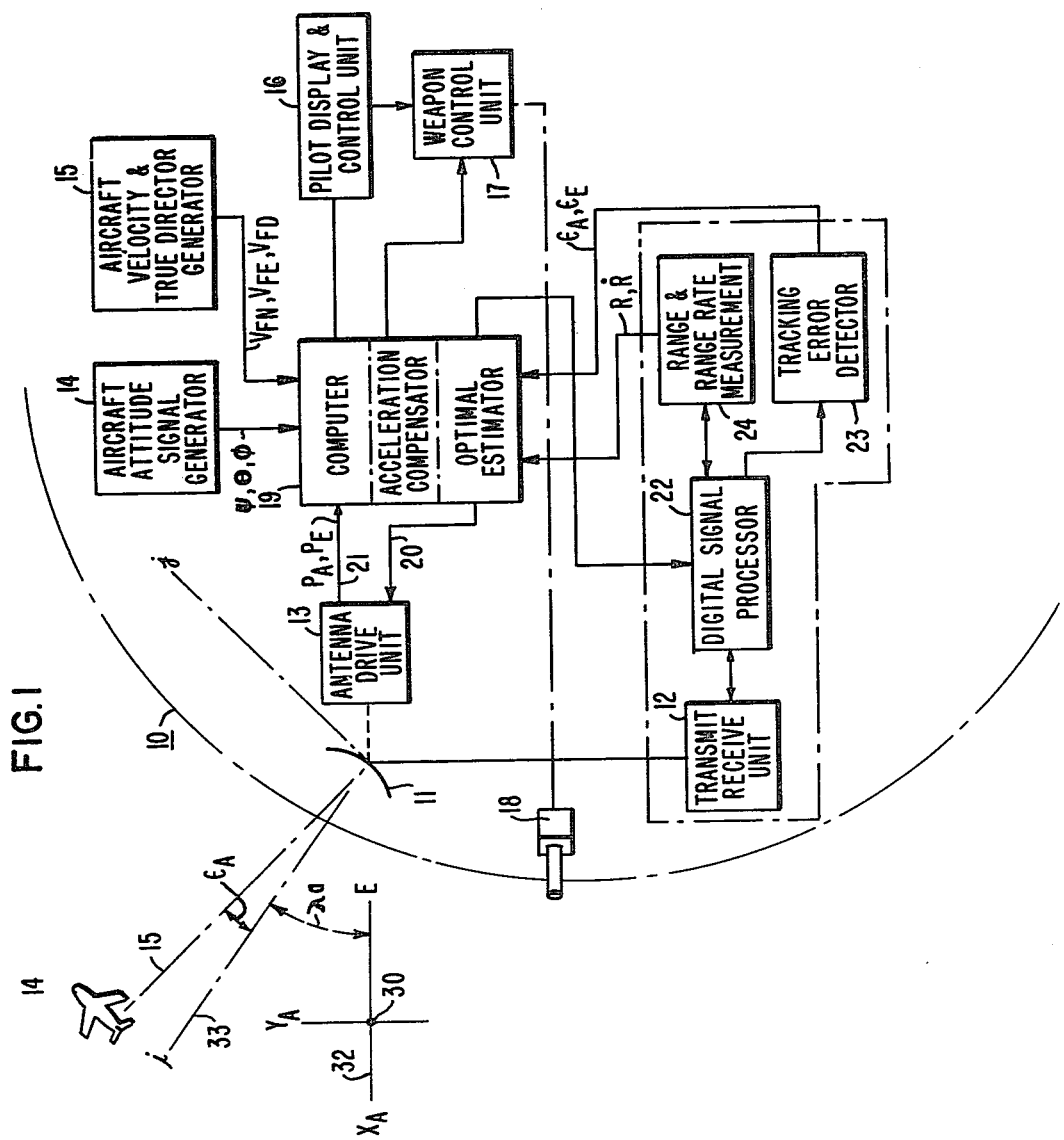
FIG. 1 is a schematic overall block diagram of a radar system according to one embodiment of the present invention.

A radar system operable in accordance with the present invention is illustrated in FIG. 1. Since the invention has particular utility in the environment of an airborne radar system, the illustrated embodiment is shown in FIG. 1 in this environment in the forward portion of an aircraft 10 and is described hereinafter in this connection. It should, however, be understood that the invention is not limited to this application.

Referring to FIG. 1, the system generally includes an antenna assembly 11, a suitable conventional transmit receive unit 12, a suitable conventional antenna drive unit 13, a suitable conventional aircraft attitude signal generator 14, a suitable aircraft velocity and true direction generator 15, a suitable coventional pilot display and control unit 16, and a weapon control unit 17 that controls the pointing of a weapon, camera or other device referred to as 18 that is required to be pointed toward the target 14.

The antenna 11 is mounted on gimbals (not shown) so that it can be driven in two or three axes of the antenna coordinate system by the antenna drive unit 13. For a three axes motion, the gimbals permit rotation of the antenna (1) in the azimuth plane about an azimuth gimbal axis which is directed downward (2) in the elevation plane about an elevation gimbal axis which rotates with (k) the azimuth gimbal and extends parallel to a line (i) from wing tip to wing tip when all gimbal angles are zero, and (3) in some instances about a roll gimbal axis usually parallel to the aircraft longitudinal axis. The order of operation of the azimuth, vertical, or roll axis, for changing the antenna position is arbitrary; and in some applications, the roll axis is not included in the system.

The antenna drive unit 13 responds to three signals for operating the radar gimbal mechanical axis (RGMA) system of the antenna drive unit 13, which signals may correspond to the direction cosines of the lines of sight (LOS) vectors for the three RGMA axes, which are commonly referred to as 1, m and n. These signals are generated by a computer 19 to drive the unit 13 over a line 20. The actual position of the antenna is fed back to the computer 19 over a line 21.

The transmit receive unit 12 provides the radar pulses to the antenna 11 and receives the echos detected by the antenna 11. The echo signals are converted to digital form and transmitted to a conventional digital signal processor 22. The digital processor 22 provides information to the computer 19 through a tracking error detector portion 23, which outputs a signal corresponding to an azimuth tracking error ($\epsilon_A$) of the antenna and a signal corresponding to an elevation tracking error ($\epsilon_E$) of the antenna with respect to the target 14. The digital signal processor 22 also provides information through a suitable coventional range and range rate measurement detector portion 24, which outputs signals to the computer 19 corresponding to the range (R) and the rate of change of the range ($\dot{R}$) of the target 14, for example.

The computer 19 is mechanized to include an optimal estimator portion, of the type referred as a Kalman estimator, and a final value or acceleration compensator portion, which modifies the estimated target acceleration signal in order to more accurately position the unit 18 for pointing at severely maneuvering targets.

In addition to the error signal $\epsilon_E$, $\epsilon_A$, and the signals R and Ṙ, the computer 19 also receives information from the aircraft attitude signal generator 14 and the aircraft velocity and true direction signal generator 15. The signal generator 14, which is sometimes referred to as a "platform" is concerned with the aircraft coordinate system or attitude of the aircraft 10 on which the radar system is mounted; i.e., the physical orientation of the aircraft. A signal psi ($\psi$) relates to the actual heading of the aircraft, a second signal theta ($\theta$) corresponds to the climb or dive attitude, and a third signal phi ($\phi$) corresponds to the roll attitude of the aircraft. This attitude information or aircraft coordinate system is measured in angles relative to an earth coordinate system, and the coordinates are referred to herein as N, E and D. For example, a negative angle $\theta$ indicates aircraft nose down and a positive angle $\theta$ indicates aircraft nose up relative to the Z-axis of the earth coordinate system. A positive angle ($\psi$) psi indicates aircraft nose between 0 and 180°, for example, and a negative angle ($\psi$) psi indicates aircraft nose between 360 and 180°, relative to the Y-axis of the earth coordinate system. A positive angle ($\phi$) phi indicates roll such that the right wing is the lower and a negative angle ($\phi$) phi indicates aircraft roll attitude such that the left wing is the lower of the two wings.

The signal generator 15 outputs to the computer 19, signals corresponding to the velocity and true direction of travel of the aircraft irrespective of the heading. For example, a signal $V_{FN}$ indicates the speed of the aircraft in a northerly direction, a signal $V_{FE}$ indicates speed in an easterly direction, a signal $V_{FD}$ indicates the climbing and the driving speed of the aircraft in feet per second, for example. The computer 19 utilizes this information to generate signals for controlling the direction of the antenna 11 and the operation of the pilot display and control unit 16 and the weapon control unit 17 as previously mentioned.

To facilitate the description hereinafter, the aircraft may be assumed to have orthogonal axes of rotation in azimuth and elevation generally indicated respectively at 30 (projecting into the paper) and 32 normal thereto. The aircraft roll axis corresponds to the longitudinal axis 32 of the aircraft. A right-hand, three-space aircraft coordinate system having axes $X_A$ and $Y_A$ as shown in FIG. 1 and a third axis $Z_A$ (positive in a direction into the paper) may be set up to define, as shown in FIG. 1, the aircraft attitude relative to a selected right-hand, three-space fixed coordinate system such as an earth coordinate system having the axes north (N), east (E) and down (D).

Likewise, the attitude of the aircraft 10 in azimuth relative to a selected fixed coordinate system may be defined in any suitable conventional manner as, for example, the angle ($\psi$) psi between the axis 32 ($X_A$) and the X-axis of the selected coordinate system, e.g., north in any earth system, measured in the X-Y plane or north-east plane of the fixed coordinate system. The attitude of the aircraft in elevation relative to the fixed coordinate system may be defined in any suitable conventional manner as, for example, the angle ($\theta$) theta between the aircraft axis 32 ($X_A$) and the X-Y plane measured in the $X_A$-Z plane. Finally, the aircraft roll angle relative to the fixed coordinate system may also be defined in any suitable conventional manner as, for example, the angle ($\phi$) phi measured clockwise about the aircraft axis $X_A$ from the X-Y plane to the $Y_A$ axis.

With continued reference to FIG. 1, assuming that a portion of the beam strikes the target 14, energy is reflected to the antenna 11 and is directed to the receiver portion of the transmitter receiver unit 12. The tracking error detector 23 then utilizes the signal reflected from the target 14 to generate azimuth and elevation angle tracking errors $\epsilon_A$ and $\epsilon_E$, respectively. The quantities $\epsilon_A$ and $\epsilon_E$ represent the angular error between the centerline or the line of sight 33 of the transmitted beam and the line of sight 15 to the target 14. The error signals $\epsilon_A$ and $\epsilon_E$ may then be applied to the computer 19 which controls the antenna drive unit 13 to position the antenna 11 in azimuth and elevation, respectively, such that the angular azimuth and elevation errors between the beam line of sight 33 and the target line of sight 15 are eliminated.

Figure 2A:
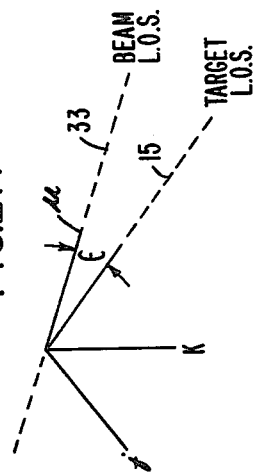
FIGS. 2A–2C are diagrams illustrating the relationships between beam and target lines of sight of the system of FIG. 1.
Figure 2B:
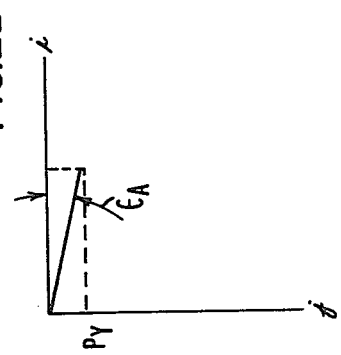
Figure 2C:
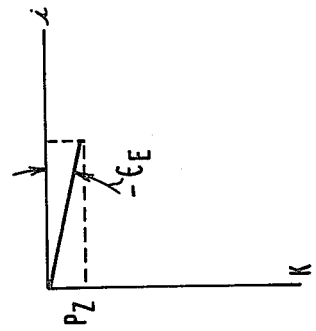

The generation of the error signals $\epsilon_A$ and $\epsilon_E$ by the tracking error detector 23 and the quantities which these signals represent are described hereinafter in connection with FIGS. 2A-2C. The actual detected error tracking signals $\epsilon_A$ and $\epsilon_E$ thus represent angular tracking errors. For example, as is illustrated in FIGS. 2A-2C, a right-hand, three-space line of sight or antennae coordinate system having orthogonal axes i, j, and k may be established with the axis i corresponding to the beam line of sight 33. In the situation in which the beam line of sight 38 and the target line of sight 15 coincide, there is no tracking error and the direction to the target may be represented by a unit vector u (i.e. a vector u of length 1) coincident with the beam line of sight 33. The unit vector u has components $u_i$, $u_j$, and $u_k$, which, with no tracking error, are given as direction cosines 1,0,0 (the 1 representing the length of the projection of the vector onto the i axis, and the 0's representing the lengths of the projections of the vector onto the j and k axes, respectively. If, on the other hand, the target line of sight 15 is displaced by an angle $\epsilon$ from the beam line of sight 33, the unit vector u representing the line of sight to the target is displaced from the i axis by the angle $\epsilon$. This angle $\epsilon$ has a component $\epsilon_A$ in the horizontal or azimuth plane defined by the axes i and j (FIG. 2B) and a compound $\epsilon_E$ in the elevation plane (FIG. 2C). The components $\epsilon_A$ and $\epsilon_E$ represent the respective azimuth and elevation angular errors between the target lines of sight and correspond to the signals $\epsilon_A$ and $\epsilon_E$ generated as tracking error signals.

It may be validly assumed that the azimuth and elevation error signals $\epsilon_A$ and $\epsilon_E$ in the respective azimuth and elevation planes are very small angular quantities when the system is placed in track mode. Thus in both the azimuth and elevation, line-of-sight planes as shown in FIGS. 2B and 2C, respectively, the projections of the unit vector u onto the i-axis is approximately equal to the unit vector length, i.e., approximately equal to 1. The projection of the unit vector u onto the j-axis is equal to (Sine $\epsilon_A$ Cos $\epsilon_E$) which, for small angles, is approximately equal to $\epsilon_A$. Likewise, the projection of the elevation angle $\epsilon_E$ onto the k-axis is approximately equal to the angle - $\epsilon_E$ for small angles (the minus sign counting for the downward direction of the k-axis). Thus, the respective azimuth and elevation angle tracking error signals may be used to represent the deviation of the unit vector u from the zero tracking error position, i.e., to represent the direction cosine errors, with respect to the beam line-of-sight, of a unit vector pointing along the target line-of-sight. When the beam line-of-sight 33 is aligned with the line-of-sight 15 to the target, the unit vector may be represented by its porjections along the line-of-sight axes i, j and k by the quantities 1,0,0 respectively. In the event that the beam and target lines of sight are not aligned, the change in the i projection is negligible in track mode so this change or deviation of the i projection from the zero track error position is assumed to be zero. The deviations of the j and k projections (initially zero with no tracking error) are approximately equal to the angle tracking errors $\epsilon_A$ and $\epsilon_E$, respectively. Thus, these deviations along the axes i, j and k may be represented by the quantity 0, $\epsilon_A$ and $-\epsilon_E$, respectively. Reference is made to U.S. Pat. No. 3,821,738 issued June 28, 1974 for a more detailed understanding of that portion of the radar system concerned with positioning a radar antenna without rate gyro's.

Figure 3:
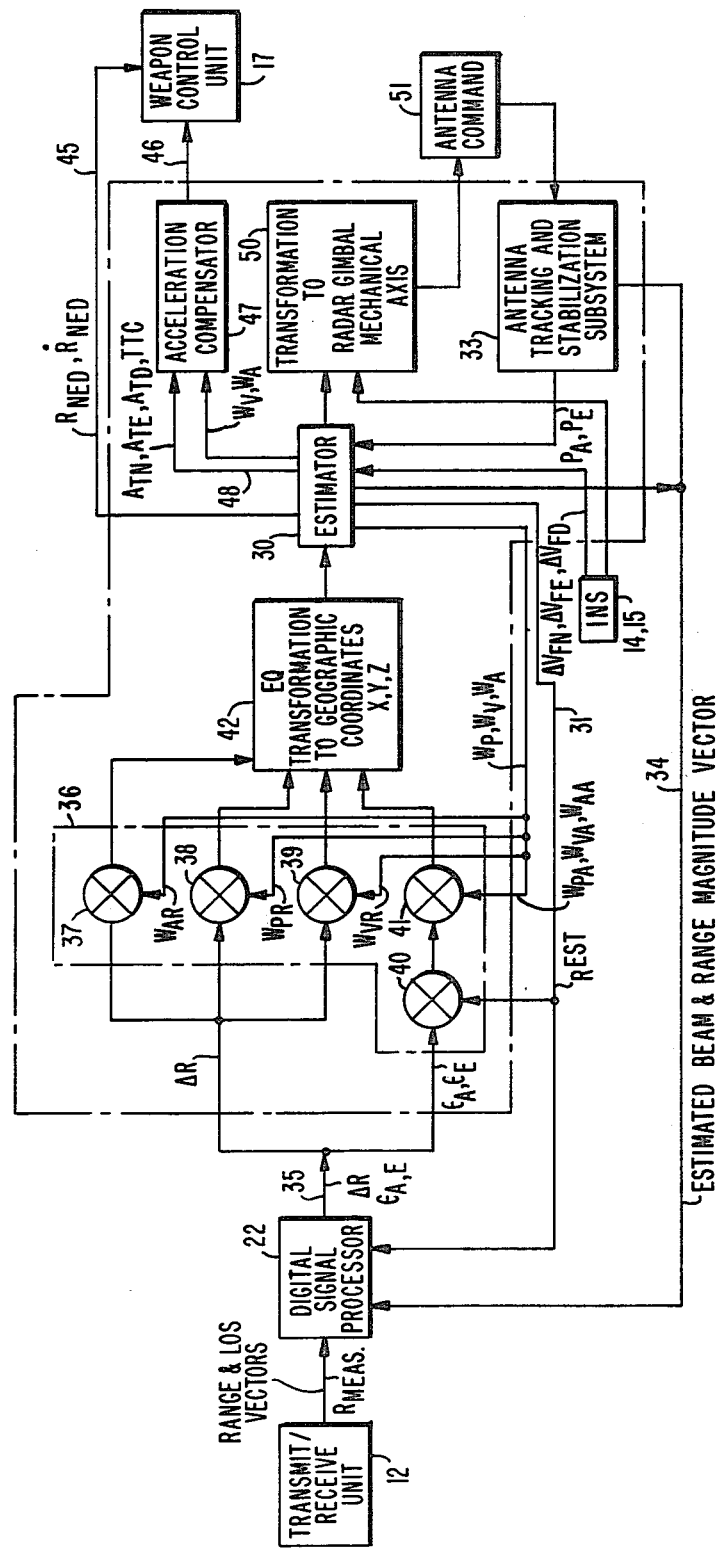
FIG. 3 is a block diagram to illustrate in more detail the computer of FIG. 1.

Referring to FIG. 3, the overall organization of the system is shown wherein the transmit-receive unit 12 outputs information relating to the range of line-of-sight vectors to the digital signal processor 22. Also, the range that is measured by the transmit-receive unit is input to the digital signal processor and is referred to as $R_M$. Additionally, an estimator 30 outputs to the digital signal processor over line 31, the estimated range $R^{EST}$ to the processor 22. Antenna tracking and stabilization subsystem referred to at 33 and the estimator 30 output information relating to the estimated beam and range magnitude vector over line 34 to the processor 22. The digital signal processor 22 outputs a value corresponding to the target range residual $\Delta R$; which is in fact the range error between the actual last mentioned range $R_M$ and the estimated range magnitude vector. Also, output from the unit 22 is the angle error in azimuth and elevation $\epsilon_A$ and $\epsilon_E$ as shown on line 35 to the input of an estimator gain factor multiplier 36. Also input to the multiplier 36 is the estimated range $R^{EST}$ and estimator gain factors, referred to as $W_P$, $W_V$, and $W_A$ which are the gains corresponding to position, velocity and acceleration from the estimator 30. The range error or residual $\Delta R$ is multiplied by the estimator gains $W_P$, $W_V$ and $W_A$ in multiplying devices 38, 39 and 37 respectively. The angle errors or residuals $\epsilon_A$ and $\epsilon_E$ are multiplied by the estimated range $R^{EST}$ by multiplying device 40. The products from the multipler 40 are then multiplied by the estimator gain factors $W_P$, $W_V$, and $W_A$ in device 41 of the estimator gain factor multiplier 36. The products of the aforementioned calculations are input to the portion of the system for transformation of the information to the geographic coordinates N, E and D referred to in block 42. Thus, the residuals are mutliplied by their respective estimator gain factors and transformed from the line-of-sight i, j and k to geographic coordinates N, E and D by a transformation unit 42 which may be formed of transformation matrices. The output from the transformation matrices or unit 42 is input to the estimator 30 which will be described in more detail hereinafter. Also input to the estimator 30 are values corresponding to ownship velocity change, since the last estimator step, along north, east and down coordinates referred to as $\Delta V_{FN}$, $\Delta V_{FE}$, and $\Delta V_{FD}$ respectively. In the event that the antenna is not aligned with the commanded position, errors $P_A$ and $P_E$ are input to the estimator 30 from the antenna tracking and stabilization subsystem 33. The weapon control unit 17 receives as its input the estimated range $R_N$, $R_E$, and $R_D$ and the estimated range rate $\dot{R}_N$, $\dot{R}_E$, $\dot{R}_D$ as shown on a line 45. The other input on line 46 is output from an acceleration compensator 47 hereinafter described, the inputs to which constitute the target time constant TTC, the estimated acceleration $A_{TN}$, $A_{TE}$, and $A_{TD}$ over a line 48 and the estimator gain factors for velocity and acceleration $W_V$, and $W_A$, respectively. The estimator outputs are also transformed to the radar gimbal mechanical axis coordinates as shown by block 50; which in turn provides the outputs for commanding the antenna at block 51. The antenna tracking and stabilization subsystem outputs the $\lambda_E$ and $\lambda_A$ values of antenna gimbal angles and also the antenna position error angles $P_E$, $P_A$ for input for the estimator. The estimated beam and magnitude vectors to the input of the digital signal processor are supplied by processing the stabilization subsystem and the estimator outputs.

Figure 4:
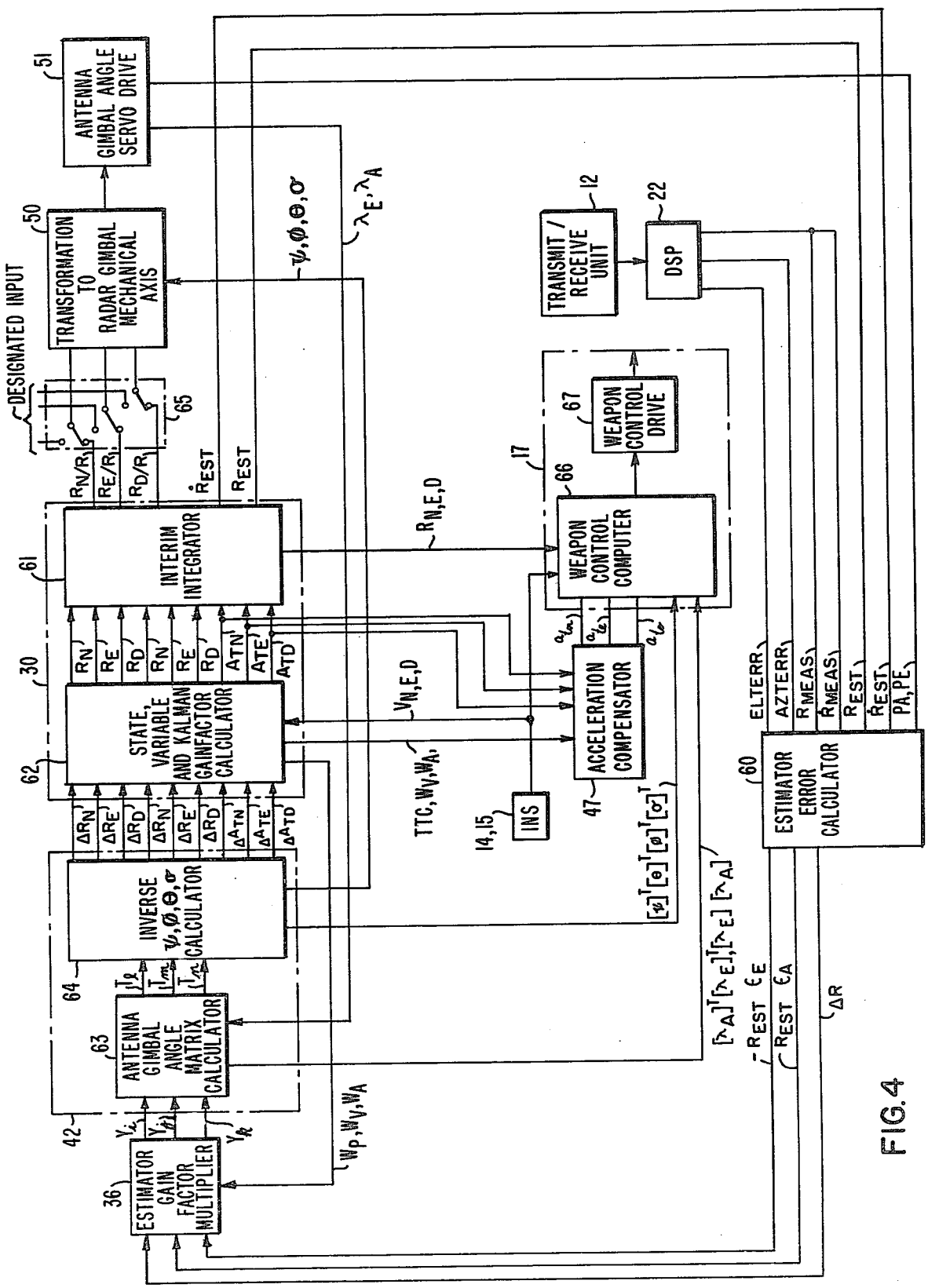
FIG. 4 is a functional block diagram to illustrate in more detail the estimator of FIG. 3.

Referring to FIG. 4, for a more detailed explanation of the system; and as mentioned in FIG. 1, the digital signal processor 22 during each calculation cycle interprets the return signals from the target 14 to determine the range ($R_M$) and the rate of change of the range ($\dot{R}_M$) and the angle error of the target in azimuth and elevation (AZTERR) and (ELTERR) relative to the antenna coordinates, respectively. An estimator error calculator referred to at 60 receives the values ELTERR, AZTERR, $R_M$, and $\dot{R}_M$ from the DSP 22 together with the estimated range and range rate of the target $R_{EST}$ and $\dot{R}_{EST}$ from the output of an interim integrator 61 hereinafter described. The unit 61 extrapolates the estimated values for commanding the antennae between calculations. Also, the estimator error calculator 60 receives error signals from the servo following system 51 in azimuth and elevation ($P_A$ and $P_E$) respectively. The estimator error calculator 60 processes the incoming information by subtracting the estimated range $R_{EST}$ from the measured range $R_M$; subtracting the servo following error in azimuth $P_A$ from the elevation angle track error AZTERR, and subtracting the servo following error in elevation $P_E$ from the elevation angle track error ELTERR. The result of the subtraction of the errors $P_A$ and $P_E$ are the values $\epsilon_A$ and $\epsilon_E$ which correspond to the angle of target error from the line of sight 33 (FIG. 1) in azimuth and elevation, respectively. Thus, the error calculator 60 removes all errors such as may be caused by the antenna mechanism so that the errors at the output of the unit 60 for input to the multiplier 36 are only those errors caused by the estimator 30 itself. These estimator erros, that is, the error between the last calculated output of the interim integrator 61 and the measured output received from the digital signal processor 22 are then multiplied by the estimator gain factors (sometimes referred to as Kalman factors) by the multiplier 36 as described in connection with FIG. 3. The Kalman gains $W_P$, $W_V$, and $W_A$ which correspond to gains for position, velocity and acceleration of the target respectively are weighting factors which are applied to the measured errors with the realization that such measured errors from the error calculator 60 may not be accurate. This inaccuracy typically is due to noise or other system errors. Thus, the signals at the output of the multiplier 36 which are weighted by the Kalman gains from the state variable and Kalman gain factor calculator 62 are referred to as $y_i$, $y_j$ and $y_k$ and represent the estimated error derived from the last measured value of target angle error in azimuth and elevation ($\epsilon_A$, $\epsilon_E$) and the range error $\Delta R$, respectively. These errors are input to an antenna gimbal angle matrix calculator 63 for correction of any deviation caused by previous movement of the antennae which may exist between the angles of the antenna gimbals and the aircraft coordinate system. To transform the weighted errors corresponding to the angle error of the target from the line of sight of the antenna coordinate system and the range error relative to such coordinate system to errors which are calculated relative to the geographic system by an inverse calculator 64, it is necessary that the transformation quantities derived from the angles of the antenna gimbals from the aircraft coordinate system, referred to as $\lambda_A$ and $\lambda_E$ must be multiplied by the corrected errors $y_i$, $y_j$ and $y_k$ respectively. This is accomplished separately from the remainder of the calculations in transforming from an aircraft coordinate system to a geographic coordinate system because it may differ for different types of radar installations. In the calculator 63, a matrix of sines and cosines of the angles $\lambda_E$ and $\lambda_A$ is formed and is multiplied by the input errors from the multiplier 36. Thus, at the output of the calculator 63 are error signals that have been calculated relative to the RGMA coordinate system heretofore mentioned and are referred to as $T_1$, $T_m$, and $T_n$. The RGMA coordinate system (l, m, n) is coincident with the aircraft coordinate system (X, Y, Z) if the misalignment angle $\sigma$ is zero. These signals are input to the inverse calculator 64 for transforming each type of angle that lies between the aircraft coordinate system and the geographic system. Such calculator is referred to as inverse because, for noninverse transformations, the angle matrices that are defined with sines and cosines are in an array such that the calculations are made for angular rotations clockwise about the geographic axis with which the angle is concerned. For example, the angle $\psi$, which is the actual heading of the aircraft relative to the geographic coordinate system is measured about an axis which points towards the center of the earth and a clockwise rotation will be starting at north and moving towards the east. The angle $\theta$ is measured about an axis which is parallel to the horizontal projection of a line from wing tip to wing tip. A clockwise direction of $\theta$ would be sensed by an observer at the center of the coordinate system facing toward the projection of the right wing tip in a horizontal plane when the aircraft nose is moving upward. The angle $\phi$ is measured about the longitudinal axis of the aircraft and is sensed as clockwise when facing forward toward the nose when the right wing tip is moving down. The angle $\sigma$ is measured clockwise about an axis parallel to a line from wing tip to wing tip when at the center of the coordinate system facing toward the right wing. In the event that you are measuring in a counterclockwise rotation, of for example a sequence of counterclockwise measurements of $\sigma$, $\phi$, $\theta$, $\psi$, respectively, the symbols would be represents by $\psi^T$, $\theta^T$, $\phi^T$ and $\sigma^T$. The first calculation in the calculator 64 is the $\sigma$ calculation that corresponds to the angle of alignment of the antenna relative to the aircraft longitudinal axis, which is the angle of alignment of the antenna relative to the aircraft coordinate system. The $\sigma$ calculation may or may not be necessary if the antenna gimbals are aligned with the aircraft coordinate system. Thus, coming out of the calculator 64 are error signals calculated with respect to the geographic coordinate system. For example, $\Delta R_N$, $\Delta R_E$, and $\Delta R_D$ are the three range errors relative to the north, east and down axes of the geographic coordinate system. The errors $\Delta \dot{R}_E$, $\Delta \dot{R}_D$, and $\Delta \dot{R}_N$ are all errors relating the rate of change of the range vector projecting along the east, down, and north axes of the geographic coordinate system respectively. The errors $\Delta AT_N$, $\Delta AT_E$, and $\Delta AT_D$, are all acceleration errors of the target measured relative to the north, east and down axes of the geographic coordinate system. These errors $\Delta R$, $\Delta \dot{R}$ and $\Delta AT$ each have three components, previously mentioned and are input to the state-variable and Kalman-gain-factor calculator 62, together with own-ship velocity relative to geographic coordinates referred to as $V_{N,E,D}$ from the inertial navigation system made up of the components 14, 15 (FIG. 1).

These error signals are made up of various components, and are calculated as follows:

$\Delta S_1 = \Delta R_N =$ the component of $(W_{pi})$ $(\Delta R)$ along the N direction
 + the component of $(W_{pj})$ (Rest) $(E_A)$ along the N direction
 + the component of $(W_{pk})$ (Rest) $(-E_E)$ along the N direction.

$\Delta S_2 = \Delta R_E =$ the component of $(W_{pi})$ $(\Delta R)$ along the E direction
 + the component of $(W_{pj})$ (Rest) $(E_A)$ along the E direction
 + the component of $(W_{pk})$ (Rest) $(-E_E)$ along the E direction.

$\Delta S_3 = \Delta R_D =$ the component of $(W_{pi})$ $(\Delta R)$ along the D (down) direction
 + the component of $(W_{pj})$ (Rest) $(E_A)$ along the D direction
 + the component of $(W_{pk})$ (Rest) $(-E_E)$ along the D direction.

$\Delta S_4 = \Delta \dot{R}_N =$ the component of $(W_{vi})$ $(\Delta R)$ along the N direction
 + the component of $(W_{vj})$ (Rest) $(E_A)$ along the N direction
 + the component of $(W_{vk})$ (Rest) $(-E_E)$ along the N direction.

$\Delta S_5 = \Delta \dot{R}_E =$ the component of $(W_{vi})$ $(\Delta R)$ along the E direction
 + the component of $(W_{vj})$ (Rest) $(E_A)$ along the E direction
 + the component of $(W_{vk})$ (Rest) $(-E_E)$ along the E direction.

$\Delta S_6 = \Delta \dot{R}_D =$ the component of $(W_{vi})$ $(\Delta R)$ along the D (down) direction
 + the component of $(W_{vj})$ (Rest) $(E_A)$ along the D direction
 + the component of $(W_{vk})$ (Rest) $(-E_E)$ along the D direction.

$\Delta S_7 = \Delta AT_N =$ the component of $(W_{ai})$ $(\Delta R)$ along the N direction
 + the component of $(W_{aj})$ (Rest) $(E_A)$ along the N direction
 + the component of $(W_{ak})$ (Rest) $(-E_E)$ along the N direction.

$\Delta S_8 = \Delta AT_E =$ the component of $(W_{ai})$ $(\Delta R)$ along the E direction
 + the component of $(W_{aj})$ (Rest) $(E_A)$ along the E direction
 + the component of $(W_{ak})$ (Rest) $(-E_E)$ along the E direction.

$\Delta S_9 = \Delta AT_D =$ the component of $(W_{ai})$ $(\Delta R)$ along the D (down) direction
 + the component of $(W_{aj})$ (Rest) $(E_A)$ along the D direction
 + the component of $(W_{ak})$ (Rest) $(-E_E)$ along the D direction.

$P_A =$ the component of $R_N/R$ along the antenna j-axis
 + the component of $R_E/R$ along the antenna j-axis
 + the component of $R_D/R$ along the antenna j-axis $-P_E$ = the component of $R_N/R$ along the antenna k-axis
+ the component of $R_E/R$ along the antenna k-axis
+ the component of $R_D/R$ along the antenna k-axis.

The unit 62 estimates the range, range rate, and acceleration of the target every 0.02 of a second, with the actual calculation of each new range and range rate occurring on alternate cycles every 0.04 of a second, for example. This information is input to the previously mentioned interim integrator 61 which extrapolates the estimated information between calculations and performs other trigonometric functions to output the estimated cosine of the range vector along the north axis $R_N/R$, along the east axis $R_E/R$, and along the down axis $R_D/R$ of the geographic coordinate system. This information is conducted through a switch 65 which is either in the designate or search mode or in the antenna tracking mode, as shown in the drawing, to input the information every 0.005 of a second for calculation with the actual heading of the ownship, the climb or dive, the roll, and the alignment of the antenna relative to the geographic axis for transforming the estimated data from the geographic coordinate system to the radar gimbal mechanical axis in the unit 50. As heretofore mentioned, the unit 61 also outputs the estimated range $R_{EST}$ and range rate $\dot{R}_{EST}$ for determining the input to the unit 60 for subsequently calculating the errors $y_i$, $y_j$ and $y_k$ which are the result of multiplying unit 60 outputs by the respective gain factors calculated with reference to the line-of-sight or antenna coordinate system.

The weapon control system 17 (FIG. 1) includes a weapon control computer referred to at 66 which provides the output signals for driving a weapon control drive unit 67. The weapon control computer receives data from the acceleration compensator 47 relating to the acceleration of the target along the north, east and down geographic coordinates referred to as $AT_N$, $AT_E$, and $AT_D$, respectively. It also receives information from integrator 61 relating to the estimated range and rate of range of the target relative to the geographic coordinates referred to as $R_{N,E,D}$ and $\dot{R}_{N,E,D}$, respectively. Additionally, the computer 66 receives information during each calculation from the antenna gimbal angle matrix calculator 63 relating to $[\lambda_A]^T[\lambda_E]^T$, and $[\pi_E][\lambda_A]$, which terms correspond to information relating to the inverse transformation and the forward transformation between the RGMA and the antenna beam coordinate axes. Finally, the weapon control unit 66 receives information from calculator 64 relative to the alignment of the antenna, heading, climb or dive, and roll of the ownship relative to the geographic coordinates from the unit 54 referred to as $[\psi]^T[\theta]^T[\phi]^T[\sigma]^T$.

Figure 5:
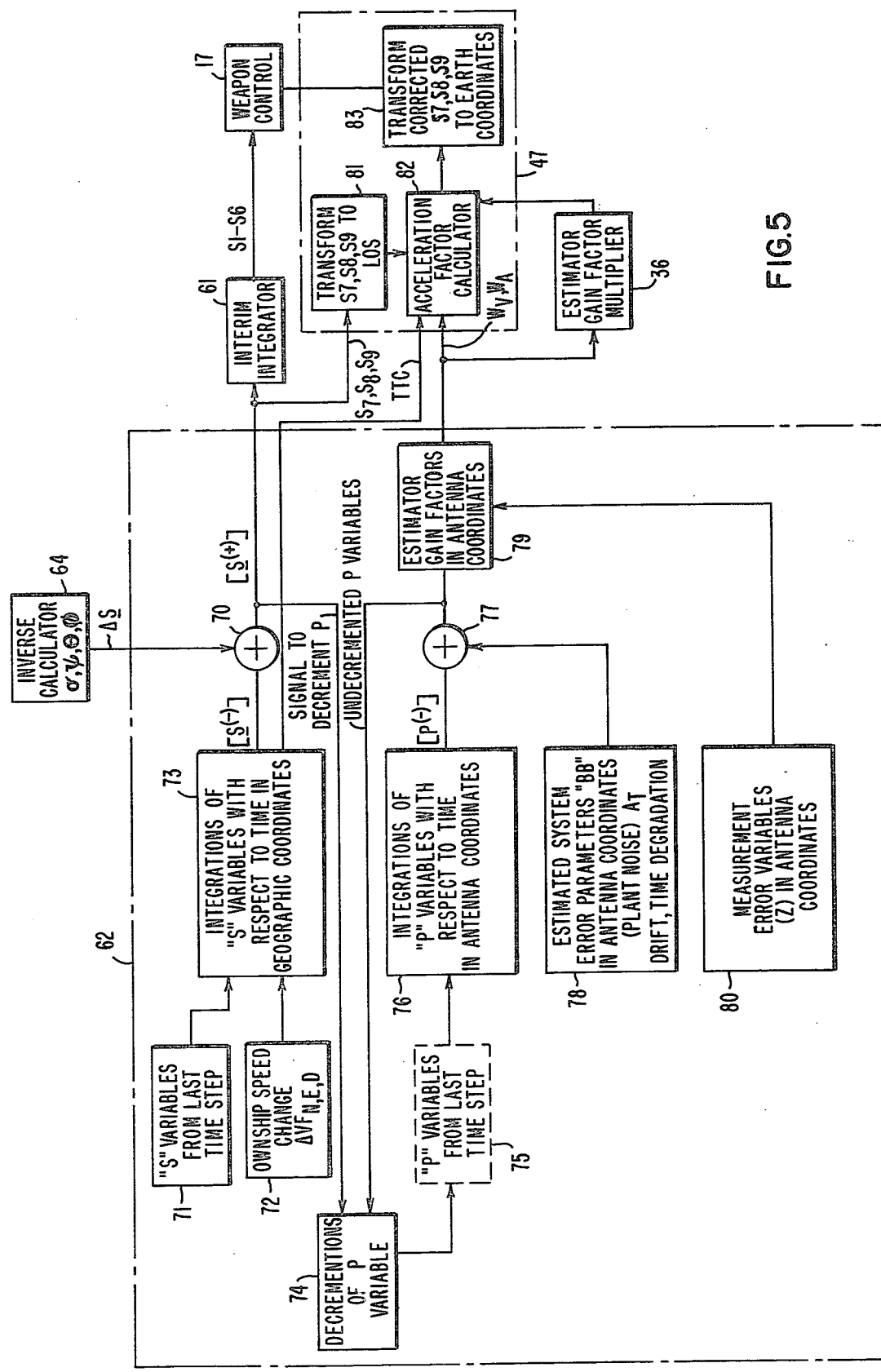
FIG. 5 is a functional block diagram to illustrate in more detail the state, variable and estimator gain calculator of FIG. 4.

Referring to FIG. 5, and the accompanying description which includes details that are the subject of another inventive entity, the state-variable and Kalman-gain-factor calculator 62 of the estimator 30 of FIG. 4 receives every 0.02 of a second the three components of estimated errors of target range, range rate and acceleration with respect to the geographic coordinate system from the inverse calculator 64. These errors, of course, are those that were calculated as a result of a comparison of the last measured quantities $R_M$, $\dot{R}_M$ and estimated quantities $R_{EST}$ and $\dot{R}_{EST}$ of range and range rate, respectively, which were calculated to obtain the a long-range error, $\Delta R$, and those calculated to obtain the estimated cross-range error ($R_{EST} \times (\epsilon_A)$) in azimuth and ($R_{EST} \times (-\epsilon_E)$) in elevation and the estimated error of range rate change $\Delta \dot{R}$ and then multiplied by the estimator gains $W_P$, $W_V$, and $W_A$ calculated during the previous time step by the multiplier 36 as described in connection with FIG. 4. These errors referred to as $\Delta R_{N,E,D}$, $\Delta \dot{R}_{N,E,D}$, and $\Delta AT_{N,E,D}$, and collectively referred to as $\Delta_S$ variables are summed at 70 with the S or state variables to obtain the updated estimated position or state of the target in geographic coordinates. Thus, the estimator estimates nine state variables. These S variables from the last time step as shown within dotted lines 71 are modified by the ownship change of velocity $VF_{N,E,D}$ along the geographic axis as shown in 72 for the integration of such variables with respect to time as shown in block 73. Such calculation is performed in accordance with the following equation.

$$S(\bar{K})_{+1} = [\phi(t_{K+1}, t_K)] S(\bar{K}) - \begin{bmatrix} q(t_{K+1} - t_K) \\ q \\ 0(3 \times 1) \end{bmatrix} \quad (1)$$

The term q represents incremental ownship INS velocity change since time $t_k$. The subscripts K and K+1 denote consecutive time steps in the digital computation. The superscript (−) indicates that no correction for an observation has been made. A (+) superscript signifies that a correction has been made after a measurement or observation. The matrix $[\phi(t_{K+1}, t_K)]$ serves as an integration with respect to time.

These integrated state variables are input to the interim integrator 61 as previously mentioned in connection with FIG. 4.

The estimator portion 62 also includes corrections to compensate for errors in the estimated states S, which are caused by system errors, as are sometimes referred to as estimation uncertainty and described as P variables. These P variables are initialized at a certain value at predetermined times and decremented during each time step. Such variables in a typical system of the type described, are those that relate to range track $[P_R]$, angle track in azimuth $[P_{AZ}]$, and angle track in elevation $[P_{EL}]$. In actual practice $[P_{AZ}]$ and $[P_{EL}]$ are equal, and only one of the pair is used.

The event, correction of the estimated system states at the output of 70, is utilized to initiate an operation to decrement the P variables at 74, which decrementation is subtracted from the P variables during the last time step at 75. These P variables, during the last time step are integrated with respect to time at 76 to calculate such variables in the antenna or line-of-sight coordinates in contrast to the geographic coordinates of the S matrix. The individual elements $P_R$, $P_{AZ}$, and $P_{EL}$ are arranged in accordance with the following equations.

$$[P_R] = \begin{bmatrix} P_{1R} & P_{AR} & P_{BR} \\ P_{AR} & P_{2R} & P_{CR} \\ P_{BR} & P_{CR} & P_{3R} \end{bmatrix} \quad (2)$$

The elements $P_{1R}$, $P_{AR}$ and $P_{BR}$ influence the Kalman gain directly when position, velocity and acceleration states, respectively, are incremented after a range observation.

$$[P_{AZ}] = \begin{bmatrix} P_{1A} & P_{AA} & P_{BA} \\ P_{AA} & P_{2A} & P_{CA} \\ P_{BA} & P_{CA} & P_{3A} \end{bmatrix} \quad (3)$$

The elements $P_{1A}$, $P_{AA}$, and $P_{BA}$ directly control Kalman gain when incrementing position, velocity, and acceleration states, respectively, after an azimuth angle track observation.

$$[P_{EL}] = \begin{bmatrix} P_{1E} & P_{AE} & P_{BE} \\ P_{AE} & P_{2E} & P_{CE} \\ P_{BE} & P_{CE} & P_{3E} \end{bmatrix} \quad (4)$$

The use of the elements of $[P_{EL}]$ is analogous to that of $[P_{AZ}]$. Unless the error covariances are significantly different between the azimuth and elevation channels only one matrix need be formed for the two channels.

Only six unique terms need be computed for any matrix $[P_R]$, $[P_{AZ}]$ or $[P_{EL}]$.

In the time integration of the estimation error covariance in block 76, the transition matrix is in accordance with the following equation.

$$[P_{R_{K+1}}{}^{(-)}] = [\phi_S(t_{K+1}, t_K)][P_{R_K}{}^{(+)}][\phi_S(t_{K+1}, t_K)]^T + [B_R]$$

$$[P_{AZ_{K+1}}{}^{(-)}] = [\phi_S(t_{K+1}, t_K)][P_{AZ_K}{}^{(+)}][\phi_S(t_{K+1}, t_K)]^T + [B_{AZ}]$$

$$[P_{EL_{K+1}}{}^{(-)}] = [\phi_S(t_{K+1}, t_K)][P_{EL_K}{}^{(+)}][\phi_S(t_{K+1}, t_K)]^T + [B_{EL}] \quad (5)$$

The matrices [B] represent the closed form of the integral of system error spectral densities (plant noise) since the last pass. Individual elements of $[B_R]$ have the values associated with the range pass of the previous mechanization. The matrix representing $[B_{AZ}]$ or $[B_{EL}]$ has the values previously mechanized for the angle pass.

The estimation errors or P variable calculated in block 76 are summed at 77 with the estimated system error parameters (BB) in antenna coordinates as shown in block 78. Such system parameters are predetermined estimates, the effect on the system of plant noise, and such variables are also in antenna coordinates.

At the input of estimator gain factor calculator 79 are the measurement error variables from block 80 in antenna coordinates referred to as Z variables which are combined with the P variables to obtain the estimator gains $W_P$, $W_V$, and $W_A$, for position, velocity, and acceleration, respectively, also expressed in antenna coordinates, for weighing the estimated range and range rate calculations in the multiplier 36 (FIG. 4).

Thus, the estimate range, range rate, and target acceleration relative to the geographic coordinate system utilizing estimator gains calculated in the antenna coordinate system are obtained for the nine state variables S in accordance with the following equations:

$$\begin{bmatrix} S_1^{(+)} \\ S_2^{(+)} \\ S_3^{(+)} \end{bmatrix}_m = \begin{bmatrix} S_1^{(-)} \\ S_2^{(-)} \\ S_3^{(-)} \end{bmatrix}_m + \begin{bmatrix} C_1^{(1)} & C_2^{(1)} & C_3^{(1)} \\ C_1^{(2)} & C_2^{(2)} & C_3^{(2)} \\ C_1^{(3)} & C_2^{(3)} & C_3^{(3)} \end{bmatrix}_m \begin{bmatrix} \left(\frac{P_{1R}^{(-)}}{P_{1R}^{(-)}+Z_R}\right)(R_{obs}-R_{pred}) \\ \left(\frac{P_{1A}^{(-)}}{P_{1A}^{(-)}+Z_{AZ}}\right)(R_{pred}\,A) \\ \left(\frac{P_{1E}^{(-)}}{P_{1E}^{(-)}+Z_{EL}}\right)(-R_{pred}\,E) \end{bmatrix}_m \quad (6)$$

The terms $P_{1R}{}^{(-)}/(P_{1R}{}^{(-)}+Z_R)$, $P_{1A}{}^{(-)}/(P_{1A}{}^{(-)}+Z_{AZ})$, and $P_{1E}{}^{(-)}/(P_{1E}{}^{(-)}+Z_{EL})$ are also designated as WPR, WPA and WPE, respectively in final value computations.

$$\begin{bmatrix} S_4^{(+)} \\ S_5^{(+)} \\ S_6^{(+)} \end{bmatrix}_m = \begin{bmatrix} S_4^{(-)} \\ S_5^{(-)} \\ S_6^{(-)} \end{bmatrix}_m + \begin{bmatrix} C_1^{(1)} & C_2^{(1)} & C_3^{(1)} \\ C_1^{(2)} & C_2^{(2)} & C_3^{(2)} \\ C_1^{(3)} & C_2^{(3)} & C_3^{(3)} \end{bmatrix}_m \begin{bmatrix} \left(\frac{P_{AR}^{(-)}}{P_{1R}^{(-)}+Z_R}\right)(R_{obs}-R_{pred}) \\ \left(\frac{P_{AA}^{(-)}}{P_{1A}^{(-)}+Z_{AZ}}\right)(R_{pred}\,A) \\ \left(\frac{P_{AE}^{(-)}}{P_{1E}^{(-)}+Z_{EL}}\right)(-R_{pred}\,E) \end{bmatrix}_m \quad (7)$$

The terms $P_{AR}{}^{(-)}/(P_{AR}{}^{(-)}+Z_R)$, $P_{AA}{}^{(-)}/(P_{1A}{}^{(-)}+Z_{AZ})$, and $P_{AE}{}^{(-)}/(P_{1E}{}^{(-)}+Z_{EL})$ are also designated as WVR, WVA and WVE, respectively in final value computations.

$$\begin{bmatrix} S_7^{(+)} \\ S_8^{(+)} \\ S_9^{(+)} \end{bmatrix}_m = \begin{bmatrix} S_7^{(-)} \\ S_8^{(-)} \\ S_9^{(-)} \end{bmatrix}_m + \begin{bmatrix} C_1^{(1)} & C_2^{(1)} & C_3^{(1)} \\ C_1^{(2)} & C_2^{(2)} & C_3^{(2)} \\ C_1^{(3)} & C_2^{(3)} & C_3^{(3)} \end{bmatrix}_m \begin{bmatrix} \left(\frac{P_{BR}^{(-)}}{P_{1R}^{(-)}+Z_R}\right)(R_{obs}-R_{pred}) \\ \left(\frac{P_{BA}^{(-)}}{P_{1A}^{(-)}+Z_{AZ}}\right)(R_{pred}\,A) \\ \left(\frac{P_{BE}^{(-)}}{P_{1E}^{(-)}+Z_{EL}}\right)(-R_{pred}\,E) \end{bmatrix}_m \quad (8)$$

The terms $P_{BR}{}^{(-)}/(P_{1R}{}^{(-)}+Z_R)$, $P_{BA}{}^{(-)}/(P_{1A}{}^{(-)}+Z_{AZ})$, and $P_{BE}{}^{(-)}/(P_{1E}{}^{(-)}+Z_{EL})$ are also designated as WAR, WAA and WAE, respectively in final value computations.

In equations (6), (7) and (8), $R_{obs}$ is observed range, $R_{pred}$ is predicted range and $E_A$ and $E_E$ are observed net angle track errors in azimuth and elevation, respectively, measured in radians. $Z_R$, $Z_{AZ}$ and $Z_{EL}$ are measurement error covariances in range, azimuth and elevation, respectively. As mechanized, further simplifications apply.

$$P_{1A} = P_{1E} \quad (9)$$

$$P_{AA} = P_{AE} \quad (10)$$

$$P_{BA} = P_{BE} \quad (11)$$

$$Z_{AZ} = Z_{EL} \quad (12)$$

After each observation or measurement, the amount of uncertainty of the estimation is reduced and the P variables are obtained in block 76 in accordance with the following equation.

$$[P_m^{(+)}] = \{[I] - [W_m][h_m]\}[P_m^{(-)}] \quad (13)$$

More specifically, $P_R$, $P_{AZ}$, and $P_{EL}$ are calculated in accordance with the following reduced form equations.

$$[P_R^{(+)}] = \begin{bmatrix} P_{AR}^{(-)}\left(1 - \dfrac{P_{1R}^{(-)}}{P_{1R}^{(-)} + Z_R}\right) & P_{AR}^{(-)}\left(1 - \dfrac{P_{1R}^{(-)}}{P_{1R}^{(-)} + Z_R}\right) & P_{BR}^{(-)}\left(1 - \dfrac{P_{1R}^{(-)}}{P_{1R}^{(-)} + Z_R}\right) \\ P_{AR}^{(-)}\left(1 - \dfrac{P_{1R}^{(-)}}{P_{1R}^{(-)} + Z_R}\right) & P_{2R}^{(-)} - \dfrac{\left(P_{AR}^{(-)}\right)^2}{P_{1R}^{(-)} + Z_R} & P_{CR}^{(-)} - \dfrac{P_{AR}^{(-)} P_{AR}^{(-)}}{P_{1R}^{(-)} + Z_R} \\ P_{BR}^{(-)}\left(1 - \dfrac{P_{1R}^{(-)}}{P_{1R}^{(-)} + Z_R}\right) & P_{CR}^{(-)} - \dfrac{P_{AR}^{(-)} P_{BR}^{(-)}}{P_{1R}^{(-)} + Z_R} P_{BR}^{(-)} & - \dfrac{\left(P_{BR}^{(-)}\right)^2}{P_{1R}^{(-)} + Z_R} \end{bmatrix} \quad (14)$$

$$[P_{AZ}^{(+)}] = \begin{bmatrix} P_{AA}^{(-)}\left(1 - \dfrac{P_{1A}^{(-)}}{P_{1A}^{(-)} + Z_{AZ}}\right) & P_{AA}^{(-)}\left(1 - \dfrac{P_{1A}^{(-)}}{P_{1A}^{(-)} + Z_{AZ}}\right) & P_{BA}^{(-)}\left(1 - \dfrac{P_{1A}^{(-)}}{P_{1A}^{(-)} + Z_{AZ}}\right) \\ P_{AA}^{(-)}\left(1 - \dfrac{P_{1A}^{(-)}}{P_{1A}^{(-)} + Z_{AZ}}\right) & P_{2A}^{(-)} - \dfrac{\left(P_{AA}^{(-)}\right)^2}{P_{1A}^{(-)} + Z_{AZ}} & P_{CA}^{(-)} - \dfrac{P_{AA}^{(-)} P_{AA}^{(-)}}{P_{1A}^{(-)} + Z_{AZ}} \\ P_{BA}^{(-)}\left(1 - \dfrac{P_{1A}^{(-)}}{P_{1A}^{(-)} + Z_{AZ}}\right) & P_{CA}^{(-)} - \dfrac{P_{AA}^{(-)} P_{AA}^{(-)}}{P_{1A}^{(-)} + Z_{AZ}} P_{BA}^{(-)} & - \dfrac{\left(P_{BA}^{(-)}\right)^2}{P_{1A}^{(-)} + Z_{AZ}} \end{bmatrix} \quad (15)$$

$$[P_{EL}^{(+)}] = \begin{bmatrix} P_{1E}^{(-)}\left(1 - \dfrac{P_{1E}^{(-)}}{P_{1E}^{(-)} + Z_{EL}}\right) & P_{AE}^{(-)}\left(1 - \dfrac{P_{1E}^{(-)}}{P_{1E}^{(-)} + Z_{EL}}\right) & P_{BE}^{(-)}\left(1 - \dfrac{P_{1E}^{(-)}}{P_{1E}^{(-)} + Z_{EL}}\right) \\ P_{AE}^{(-)}\left(1 - \dfrac{P_{1E}^{(-)}}{P_{1E}^{(-)} + Z_{EL}}\right) & P_{2E}^{(-)} - \dfrac{\left(P_{AE}^{(-)}\right)^2}{P_{1E}^{(-)} + Z_{EL}} & P_{CE}^{(-)} - \dfrac{P_{AE}^{(-)} P_{AE}^{(-)}}{P_{1E}^{(-)} + Z_{EL}} \\ P_{BE}^{(-)}\left(1 - \dfrac{P_{1E}^{(-)}}{P_{1E}^{(-)} + Z_{EL}}\right) & P_{CE}^{(-)} - \dfrac{P_{AE}^{(-)} P_{AE}^{(-)}}{P_{1E}^{(-)} + Z_{EL}} P_{BE}^{(-)} & - \dfrac{\left(P_{BE}^{(-)}\right)^2}{P_{1A}^{(-)} + Z_{EL}} \end{bmatrix} \quad (16)$$

The acceleration compensator within the dashed lines referred to at 47, which was discussed in connection with FIG. 4, receives the estimated values for estimated target acceleration $AT_N$, $AT_E$, and $AT_D$ relative to the geographic or earth coordinates. These estimated acceleration values are referred to as S7, S8, and S9 in the previous equation. Also, the target time constant, TTC, and the estimator gain factors $W_V$, and $W_A$ which were calculated in block 79 are input to the compensator 47. The compensator calculates a corrected estimation factor for input to the weapon control unit for properly aiming the weapon at severely maneuvering targets that are accelerating in excess of 1G, for example. As previously mentioned, the acceleration estimation requires that old or obsolete estimates; that is, those estimates that were calculated during a previous step are allowed to decay. The penalty is that the magnitude of the acceleration estimate never achieves its full value. This attenuation inherent in the estimating process is sufficient to preclude successful control of a weapon, camera, or other aiming device with respect to severely maneuvering targets. Thus, the compensator 47 is intended for use in correcting the acceleration outputs from the state variable and Kalman gain factor calculator 62 of the estimator 30. The compensator 47 transforms the acceleration estimates S7, S8, and S9 from geographic coordinates to line-of-sight coordinates, as noted at block 81. These transformed values are then combined in a manner hereinafter described with the Kalman gain factors $W_V$ and $W_A$ by an acceleration factor calculator 82. The corrected acceleration outputs from the block 82 are then transformed to geographic or earth coordinates at block 83 where they are utilized along with the estimated range and range rate calculations by the weapon control unit 17. The block 82 also receives an input TTC which corresponds to the target time constant by which the acceleration calculation is decremented during each calculation of the computer.

Figure 6:
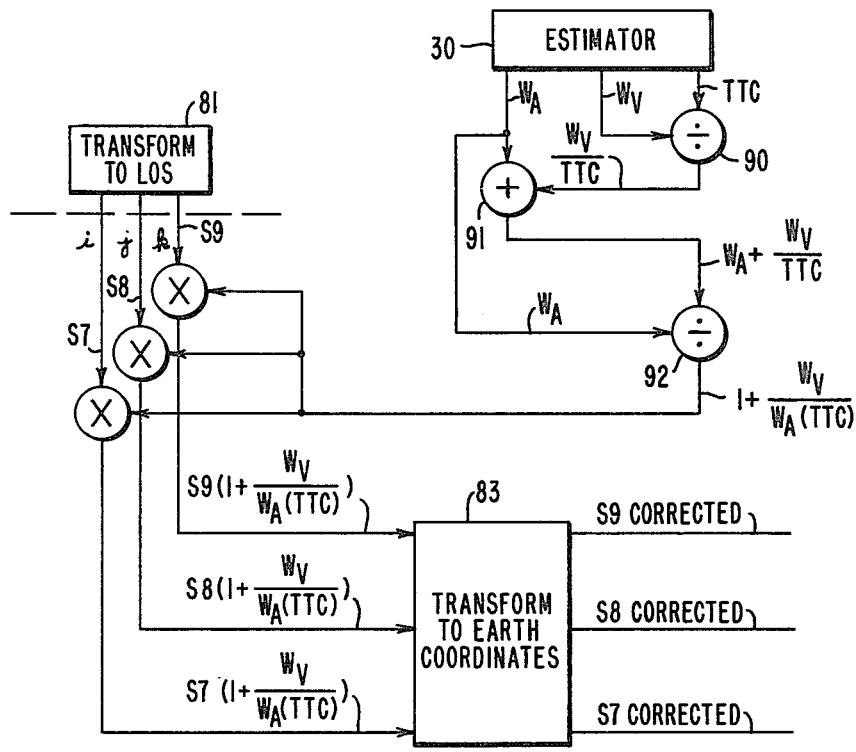
FIG. 6 is a schematic diagram illustrating the acceleration compensation portion of the system according to one embodiment of the present invention.

Referring to FIG. 6, the estimator or Kalman gain $W_V$ is divided by the target time constant TTC at device 90. The output of the device 90 is then added at 91 to the estimator gain $W_A$ to obtain a result $W_A$ plus $W_V/TTC$. This result is then divided by the estimator factor $W_A$ at 92 to obtain the result $1 + W_V/W_{A(TTC)}$. The estimated acceleration terms relative to the dead-ahead, righthand and down coordinates of the line-of-sight system referred to as S7, S8 and S9, respectively, are then each multiplied by the quantity $1 + W_V/W_{A(TTC)}$ to obtain the corrected acceleration estimates that are then transformed relative to earth coordinates for controlling the weapon control system.

Figure 7:
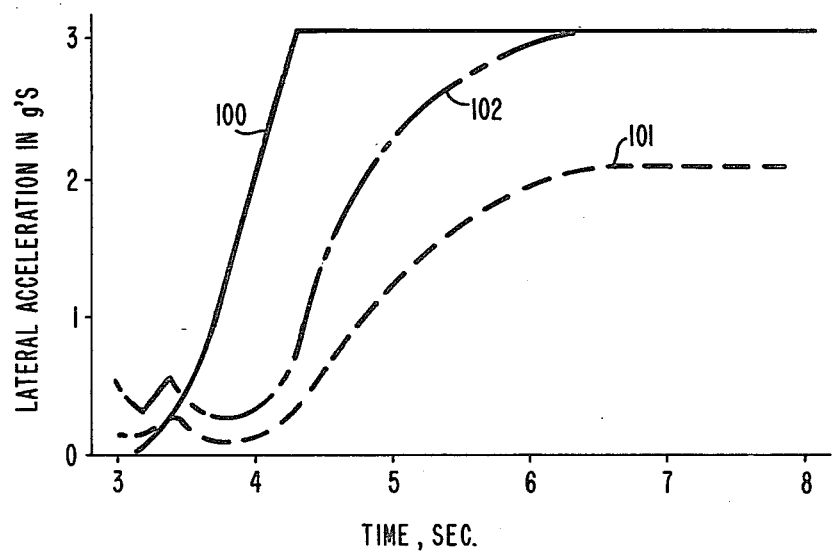
FIGS. 7 and 8 are graphical illustrations of the operation of a system with and without the benefit of the acceleration compensator.
Figure 8:
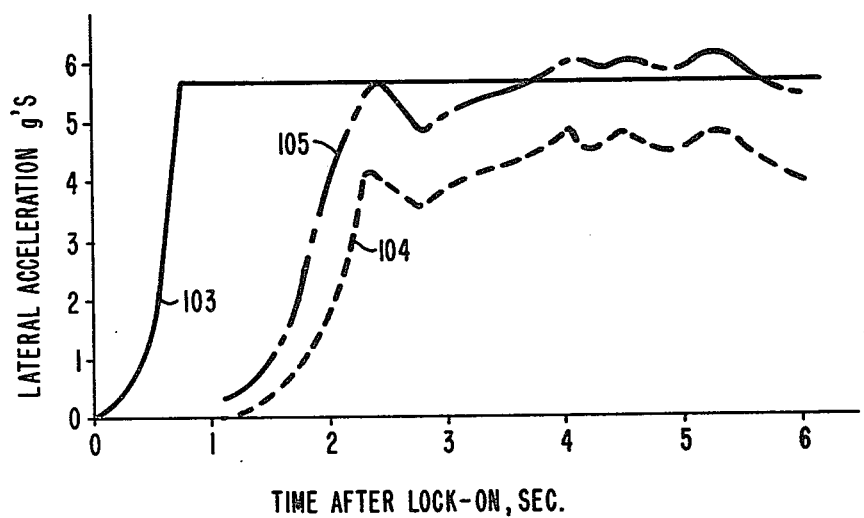
Figure 9:
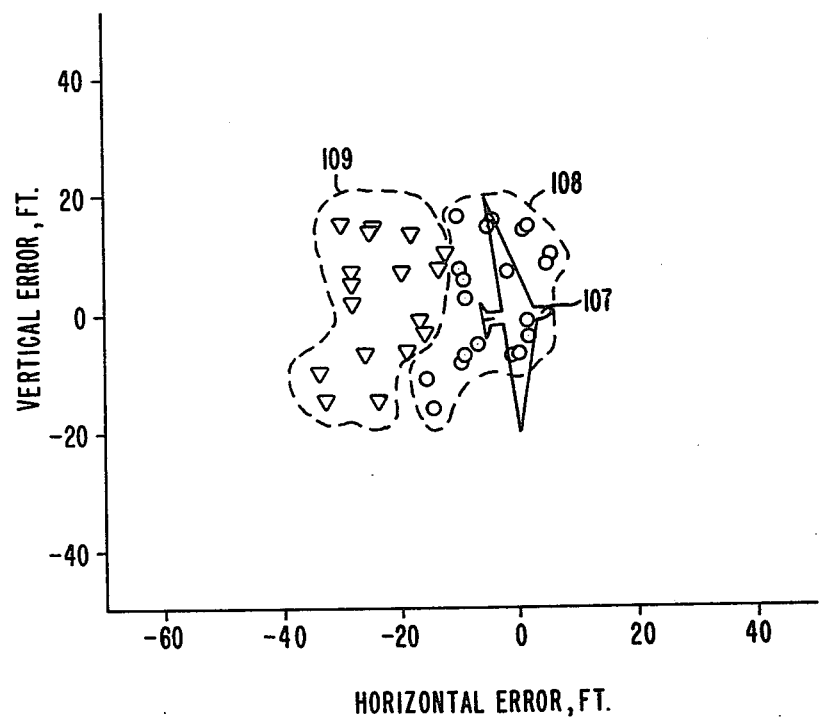
FIG. 9 is a diagram illustrating the errors in the operation of a system with and without the benefit of the present invention.

Referring to FIG. 7, a graphical illustration of a radar system utilizing a nine state estimator in a three dimensional simulation of an aircraft tracking a maneuvering target, was simulated both with and without the acceleration compensator herein described. In the graph, it is assumed that the tracking aircraft and the target aircraft are approaching headon in an initial segment of antiparallel non-maneuvering flight. Three seconds after lock-on of the tracker, both aircraft turn away from each other in 3-G horizontal turns. Radar noise is omitted for ease of comparing accuracy. Line 100 represents the true acceleration of the target aircraft relative to intertial space. Dashed line 101 represents the estimated acceleration of the target aircraft without the benefit of the acceleration compensator; and line 102 represents the estimated acceleration of the target aircraft utilizing the acceleration compensator. It is seen from FIG. 7 that without the compensator, the estimated acceleration reaches only about two-thirds of the true value. With the compensator, it is seen from the graph of FIG. 7 that the estimated acceleration coincides with the actual acceleration less than three seconds after breakaway. Referring to FIG. 8, the graph illustrates the results of a tracker located behind the target at an average aspect angle of 163° off the target nose. The target is turning with 5.67 G's of lateral acceleration toward the line-of-sight of the aircraft antenna. Radar noise is applied to the track inputs. In FIG. 8, curve 103 represents the true target acceleration, curve 104 represents the estimated acceleration without the compensator; while curve 105 represents the estimated acceleration with the compensator. Thus it can be seen from FIGS. 7 and 8 that the estimation of acceleration is much improved by the compensator under noisy conditions when the estimated acceleration is appreciable. To prevent magnification of pure noise, it is found that the compensation of acceleration should be suppressed when the acceleration estimate is under some threshold in the neighborhood of one-half G's, for example (see FIG. 10C, block 126'). Referring to FIG. 9, the use of a compensator to improve the prediction of future target position is illustrated in which the conditions are the same as for FIG. 8. Here, a target silhouette 107 is shown with a predicted center of the target selected normal to the line-of-sight. An envelope of predicted locations within the dashed lines referred to at 108 encloses the target silhouette 107 when the compensator is used. However, the envelope of predicted positions referred to within the dashed lines 109 does not intersect the target 107 when the compensator is not utilized. In the above examples, a two-second and a variable time constant TTC were used to decrement old estimates in FIGS. 7 and 8, respectively. Thus, improved results for rapidly maneuvering targets where the attenuation of estimated acceleration can be corrected by multiplying the attenuated reading by the reciprocal of the final value of the unit step response provides an improved estimate for weapon control systems.

Figure 10A:
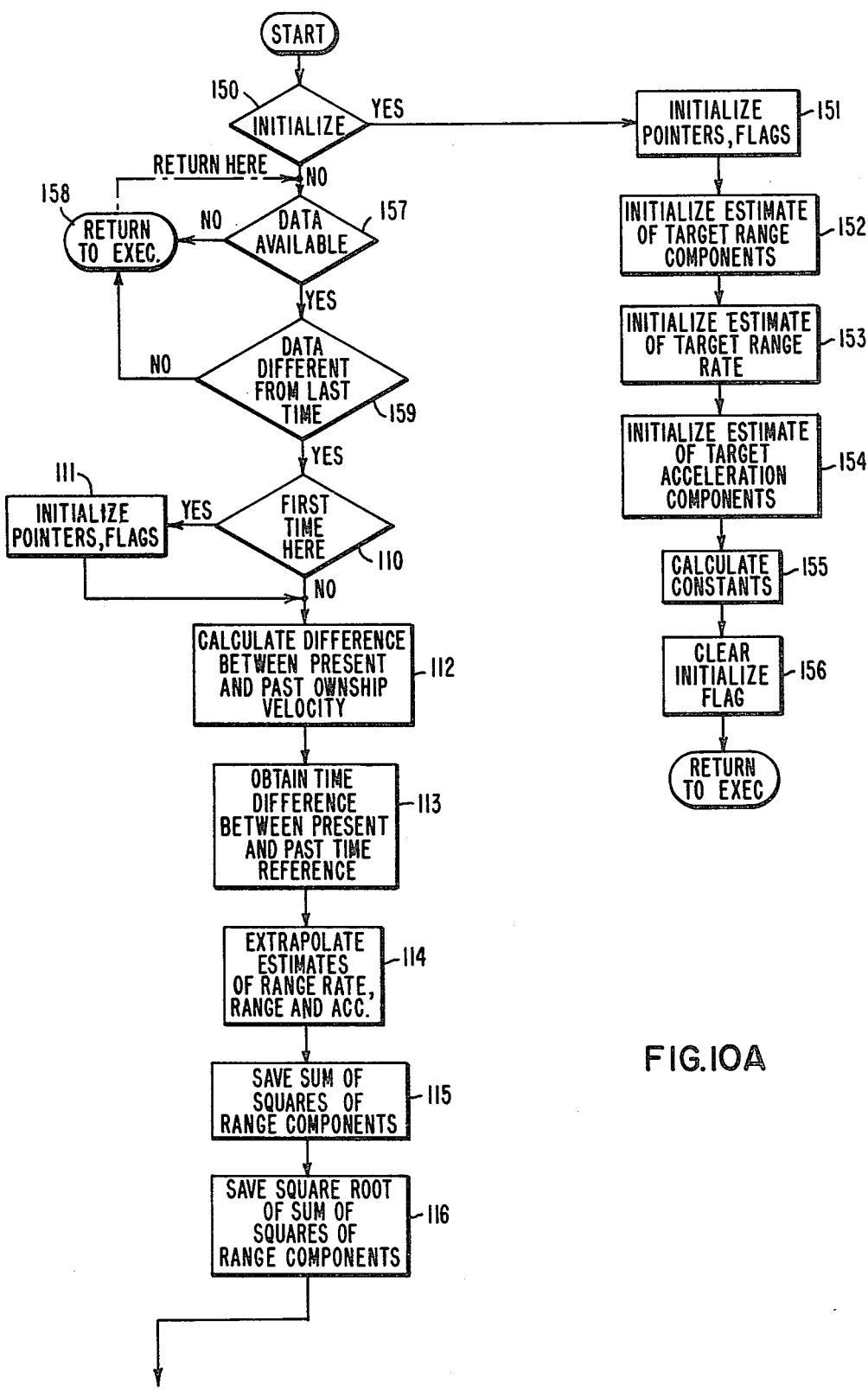
Figure 10B:
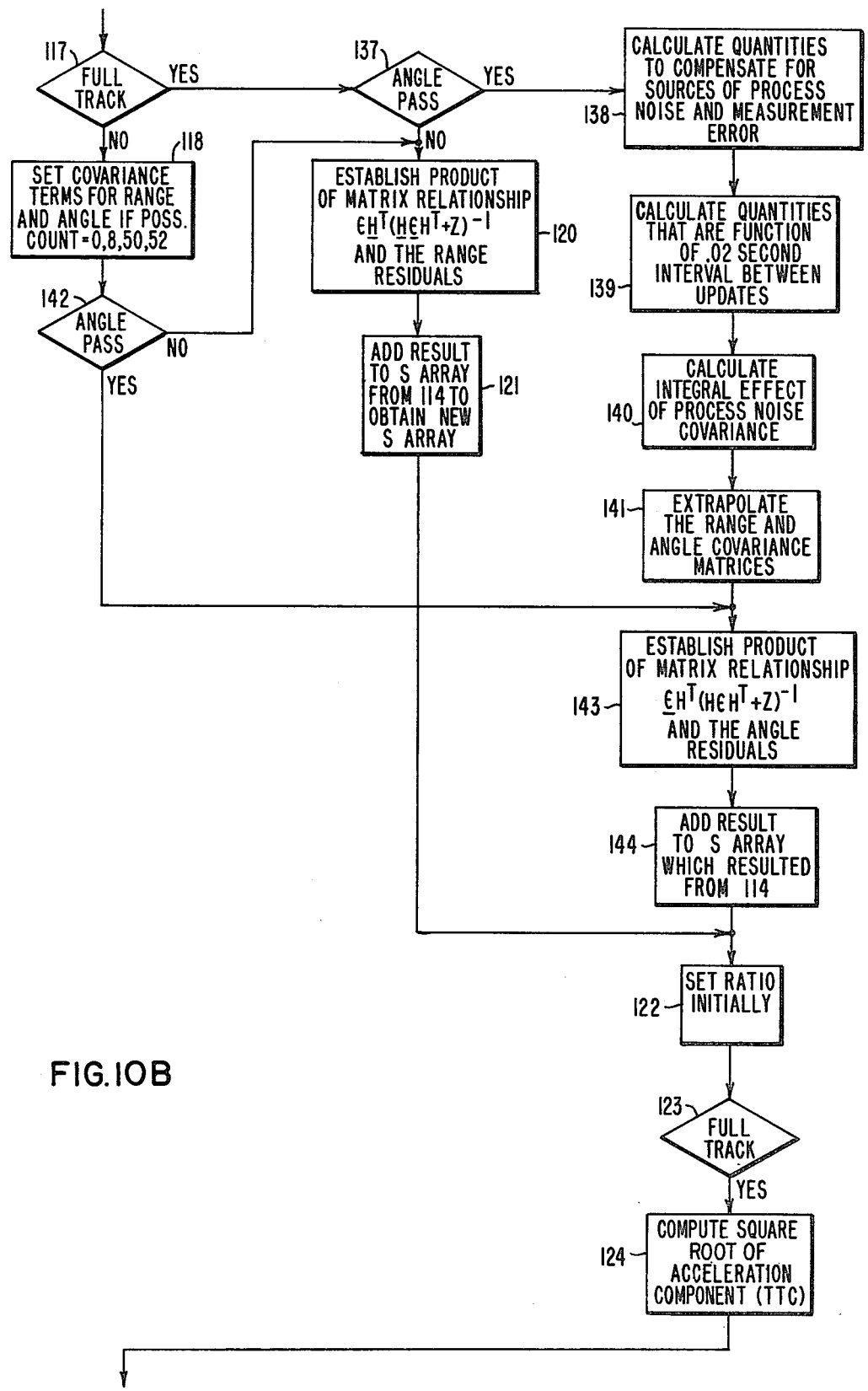

Referring to FIGS. 10A–10C, a flow chart of the Kalman type estimator is shown. The estimator receives a variety of hardware and software system inputs as previously mentioned and produces relative output target range or position, range rate or velocity, and acceleration estimates. The estimator initially sets up an array for range, range rate, and acceleration, then looks at measurements that the radar system is making. Also, error information is obtained from the inputs to the estimator regarding how far the previous estimate was in error. The estimator then receives an error and accepts a portion of that error. The accepted portion of that error, which is referred to as the Kalman gain, is then factored into the next estimate for range, azimuth, and elevation of the target. The fraction of the error used is of course determined by the gain of the estimator. The main output of the estimator, as previously mentioned, is a nine element array, referred to as S(1) through S(9), which contain the X, Y, and Z platform coordinates for position, velocity, and total target acceleration.

Referring to FIG. 10A, the program is initialized at block 150 whenever the track mode of the radar system is initiated. When the system indicates that initialization is to be performed, the flags and pointers, and constants for glint effect, process noise, and covariance are initialized at block 151. As shown in block 152, the estimate of target range components is initialized and the space to platform coordinates for S(1), S(2), and S(3) are transformed from space to platform in accordance with the following equation.

$S(1) = R_{XP}$
$S(2) = R_{YP}$
$S(3) = R_{ZP}$ where $R_{XP}$, $R_{YP}$, and $R_{ZP}$ are the geographic coordinate components of target range, and in particular $$\begin{vmatrix} R_{XP} \\ R_{YP} \\ R_{ZP} \end{vmatrix} = [\psi_P]^{-1} \cdot \begin{bmatrix} AARANGE * AAUVLOSX \\ AARANGE * AAUVLOSY \\ AARANGE * AAUVLOSZ \end{bmatrix}$$

$$[\psi_P]^{-1} = \begin{vmatrix} \cos\psi & -\sin\psi & 0 \\ \sin\psi & \cos\psi & 0 \\ 0 & 0 & 1 \end{vmatrix}$$

AARANGE = initial centroided range to target $\begin{vmatrix} AAUVLOSX \\ AAUVLOSY \\ AAUVLOSZ \end{vmatrix}$ = line of sight unit vector (components) in space coordinates, or coordinate system of the scan pattern generator The above is mechanized in block 102 as follows:
$S(1) = [(\cos\psi_P)(AAUVLOSX * AARANGE) + (\sin\psi_P)(AAUVLOSY * AARANGE)]$
$S(2) = [(\sin\psi_P)(AAUVLOSX * AARANGE) + (\cos\psi_P)(AAUVLOSY * AARANGE)]$
$S(3) = [AAUVLOSZ * AARANGE]$ At block 153, the target range rate is initialized as follows:
$S(4) = -VX_P$
$S(5) = -VY_P$
$S(6) = -VZ_P$
where
S(4) = negative of ownship motion: platform X
S(5) = negative of ownship motion: platform Y
S(6) = negative of ownship motion: platform Z Next, the estimate of target acceleration components are initialized at block 154 by setting the acceleration components S(7), S(8), and S(9), to zero. The next step of initialization, occurs at block 155 where certain computational constants are calculated which are functions of the assumed average interval between estimation updates (1/50 of a second equals 0.02) for example. These constants are initialized by setting the time interval H to equal 0.02. Also, the remaining constants are set as follows.

ZE1 = square of range independent glint
AK1 = $H^2$
AK2 = AK 1/2
AK3 = H(AK2)
AK4 = $(AK2)^2$ where AK1, AK2, AK3, AK4 are constants.

Then, the initialized flag is cleared as shown at block 156 and the control is returned to the executive program. Upon returning from the executive program after initialization, tests are performed to determine if new data has become available as shown by block 157. If no new data is available, control is returned to the executive program as shown at 158; but if new data is available as shown at block 159, the program checks to determine this is the first time at block 110 and then the pointers and flags are initialized at 111 as previously described in connection with block 151.

If the answer is in the negative from the block 110, the difference between the present and past ownship velocity is then calculated at block 112. Here, the filter estimates of range, range rate, and acceleration are extrapolated to the time reference to be used for the current update in accordance with the following equations:

$$R_{NEW} = R_{OLD} + \Delta t_K (V_{OLD} - \tfrac{1}{2} \Delta V_{INU}) + \tfrac{\Delta t^2_K}{2} \cdot A_{OLD}$$
$$V_{NEW} = V_{OLD} + \Delta t_K \cdot A_{OLD} - \Delta V_{INU}$$
$$A_{NEW} = A_{OLD} \cdot \left(1 - \tfrac{.02}{\tau_a}\right)$$

where:

$\Delta t_K$ = the time between this and the last time reference
$\tau_a = A_{OLD}/32$ = target acceleration time constant
$V_{INU}$ = change in ownship motion since last update.

Block 112 is mechanized as follows: First obtain change in ownship motion:

Q0 = $VX_P$ − VXO
Q1 = $VY_P$ − VYO
Q2 = $VZ_P$ − VZO where:

$\left.\begin{matrix}VXO\\VYO\\VZO\end{matrix}\right\}$ = last set of platform coordinates of ownship motion $\left.\begin{matrix}VX_P\\VY_P\\VZ_P\end{matrix}\right\}$ = current set of platform coordinates of ownship motion Then, the time difference $t_K$ between the present and the past time references obtained at block 113 in accordance with the following equation.

Obtain $t_K$ = H1 = (AATUP − AAKACLOK)

where:

AATUP = time associated with current update
AAKACLOK = time associated with previous update The estimates of range, range rate, and acceleration can now be extrapolated to the current reference time at block 114 in accordance with the following equations.

$$S(1)_{NEW} = S(1)_{OLD} + H1\left[S(4)_{OLD} - \tfrac{Q0}{2}\right] + (H1)^2/2*S(6)$$

$$S(2)_{NEW} = S(2)_{OLD} + H1\left[S(5)_{OLD} - \tfrac{Q1}{2}\right] + (H1)^2/2*S(7)_{OLD}$$

$$S(3)_{NEW} = S(3)_{OLD} + H1\left[S(6)_{OLD} - \tfrac{Q2}{2}\right] + (H1)^2/2*S(8)_{OLD}$$

$S(4)_{NEW} = S(4)_{OLD} + H1 * S(7)_{OLD} - Q0$
$S(5)_{NEW} = S(5)_{OLD} + H1 * S(8)_{OLD} - Q1$
$S(6)_{NEW} = S(6)_{OLD} + H1 * S(9)_{OLD} - Q2$
$S(7)_{NEW} = S(7)_{OLD} * (1 - HTITC)$
$S(8)_{NEW} = S(8)_{OLD} * (1 - HTITC)$
$S(9)_{NEW} = S(8)_{OLD} * (1 - HTITC)$ where:

HTITC = (0.02/Target Time Constant)

Next, the sum of the squares of the range components are saved at block 115 in accordance with the following equation.

$SCRG = S^2(1) + S^2(2) + S^2(3)$

Then, at block 116, the square root of the sum of the squares of the range components are saved as follows:

$YR = \sqrt{S^2(0) + S^2(1) + S^2(2)}$

The system then determines whether or not the target is within a predetermined range and the count of pass counter, which is a counter that passes a certain calculation. The pass counter determines when the range rate estimate is accurate enough to allow acceleration estimation. For example, as shown by block 118, a count of 8 allows range rate estimation to begin, whereas a count of 50 allows acceleration estimation to begin. Only range is being estimated between the counts of 0 and 8. The pass counter must reach a count of 53, for example, for full tracking operation to begin as noted by the decision block 117. If the target is beyond a predetermined limit, the count of 50 will not be exceeded by the pass counter. If normal tracking is in progress, the constant P logic described in connection with block 118 is performed if at the pass 0, 8, or 50.

Assuming that it is a full track, and there is not an angle pass in the present calculation, the product of the matrix relationship and the range residual is established as shown at block 120. For a range or angle update form the following matrix relationship, referred to as the weighting matrix, W:

$W = P H^T (H P H^T + Z)^{-1}$ where:

P = the covariance matrix (for range)
H = the sensitivity matrix, which defines how the range residual or angle residual shall be distributed over the current estimate of target range, range rate, and acceleration
Z = the observation mean-square error matrix Form the product of W and the range residual or angle residual and add the result to the extrapolated S array components resulting from the calculation of the block 114.

The above is mechanized for a range residual as follows: Calculate:

PPSIGR = P(1,1,1) + ZR
B = PPSIGR * SCRG
BIGL (IX) = YR * AARERR * 16.

$$IX = 0$$
$$1$$
$$2$$

For IX = 8, I = 2, II = 2 initially, calculate:
U = P(1,II,1) * S(I)

$UB = (U/2^4)/B$ $ULB = UB * BIGL (II)$ $S(IX)_{NEW} = S(IX)_{OLD} + ULB$ where:

ZR = an adjustment for range measurement error

SCRG = $S^2(0) + S^2(1) + S^2(2)$ as defined in connection with the description of the equation for block 115.

AARERR = range residual

"IX" is decremented by 1 until 0, after which calculations cease.

"I" is decremented by 1 until negative, then reset to 2.

"II" is decremented by 1 whenever I is reset to 2.

ULB = product of range residual and the weighting matrix $S(IX)_{OLD}$ = Those S values from equations described in connection with the block 114.

YR = $\sqrt{S^2(0) + S^2(1) + S^2(2)}$

The above equation for block 120 is executed 9 times according to the following values of IX, I, II:

| IX | I | II |
|----|---|----|
| 8  | 2 | 2  |
| 7  | 1 | 2  |
| 6  | 0 | 2  |
| 5  | 2 | 1  |
| 4  | 1 | 1  |
| 3  | 0 | 1  |
| 2  | 2 | 0  |
| 1  | 1 | 0  |
| 0  | 0 | 0  |

Then, the estimates of range rate, range, and acceleration in accordance with the equations described in connection with block 114 are added to the S array to obtain a new S array as shown at block 121. Then, the ratio of 0.02 to the target time constant is determined at block 122 in accordance with the following equation initially.

Let HTITC = 0.02/3.5

If the estimator is in full track as determined by decision block 123, the square root of the acceleration components are computed at block 124 in accordance with the following calculation.

TTC    Arbitrary Computation

Let HTITC = 0.02 and if

TTC $\geq$ 32, re-calculate.

Then, the ratio is reset at block 125 which in effect accomplishes substitution of the new computation for the initial value. After the resetting of the ratio, the acceleration is checked to determine whether or not it is less than 1G at decision block 126; and if it is not, the ratio is reset as shown at block 127 in accordance with the final equation described in connection with block 104 where the estimate of target acceleration components was initiated.

If in this computation, there was not an angle pass as noted by decision block 128 and the system is in full track as noted at decision block 129, the block 130 performs an adjustment to the P matrix; that is the covariance matrix, to reduce the uncertainty in the estimator of range, range rate, and acceleration due the the addition of more measurement information. To obtain the new matrix adjustment, the values which are calculated from H, P, and W are subtracted from the old P matrix. W is the weighting matrix, P is the covariance matrix for range, and H is the sensitivity matrix, which defines how the range error or residual or angle error or residual shall be distributed over the current estimate of target range, range rate, and acceleration. This adjustment is mechanized at the block 130 on alternate cycles or range passes as follows.

$P(2,2,MP) = P(2,2,MP) - P(1,2,MP)^2/PPSIGX$ $P(2,3,MP) = P(2,3,MP) - P(1,2,MP) * P(1,3,MP)/PPSIGX$ $P(3,3,MP) = P(3,3,MP) - P(1,3,MP)^2/PPSIGX$ $P(1,3,MP) = P(1,3,MP) - P(1,1,MP) * P(1,3,MP)/PPSIGX$ $P(1,2,MP) = P(1,2,MP) - P(1,1,MP) * P(1,2,MP)/PPSIGX$ $P(1,1,MP) = P(1,1,MP) - P(1,1,MP)^2/PPSIGX$ where:

MP = 1 for range PPSIGX = PPSIGR

MP = 2 for angle, PPSIGX = PPSIGE

If the system is not in full track, the calculation 130 is omitted. Then, the pointers and counters are updated as described in connection with the block 101 at 136 and the program is returned to the executive.

If there is an angle pass as noted in decision block 137, then the quantities to compensate for the sources of process noise and measurement error are calculated at block 138 as follows:

ZE2 = means of square angle noise error $\left.\begin{array}{l} N2 \\ N3 \end{array}\right\} = $ functions of spectral density
= computational factors Then, the quantities are calculated that are functions of 0.02 second intervals between updates at block 139. These are computational constants which are functions of the assumed interval between estimator updates and are as follows.

$H2D3 = H^2/3$ $H3D8 = H^3/8$ $H33 = H^3/3$ $H4D20 = H^4/20$ where:

$H = 0.02$

Subsequently, the integral effect of the process noise covariance is calculated at block 140. This takes into account the integrated effect of the noise for range and angle updates. For range, the integrated effect is as follows.

$BB(0) = N2 * H33 + N3 * H4D20$ $BB(1) = N2 * AK2 + N3 * H3D8$ $BB(2) = N3 * H223$ $BB(4) = N2 * H + N3 * H2D3$ $BB(5) = N3 * H$ $BB(8) = N3$

For angle, the integrated effect is as follows.

$BB(9) = $ a function of $BB(0)$ $BB(10) = $ a function of $BB(1)$ $BB(11) = BB(2)$ $BB(13) = $ a function of $BB(4)$ $BB(14) = BB(5)$ $BB(17) = BB(8)$ Then, at block 141 an extrapolation of the range and angle covariance error matrices is performed to take into account the increased uncertainty over the assumed average interval between estimator updates since the last update. This is represented in matrix form as follows:

$P_{NEW} = \phi P_{OLD} \phi^T + BB$ where:

$\phi$ = static transition matrix $$\phi = \begin{bmatrix} I(\Delta t) & I\left(\dfrac{\Delta t}{2}\right) & I \\ O & I(\Delta t) & I \\ O & O\left(\dfrac{1 - \Delta t}{Ta}\right)I \end{bmatrix}$$

where: $\Delta t$ = assumed average interval between Kalman filter updates $$I = \begin{bmatrix} 1 & 0 & 0 \\ 0 & 1 & 0 \\ 0 & 0 & 1 \end{bmatrix} = \text{Identity Matrix}$$

$[\ ]^T = >$ transpose
BB = process noise covariance matrix $$O = \begin{bmatrix} 0 & 0 & 0 \\ 0 & 0 & 0 \\ 0 & 0 & 0 \end{bmatrix} = \text{Null Matrix}$$

In the estimator, this is mechanized as follows:
For MP = 1 and then 2,
P(1,1,MP) = P(1,1,MP) + AK1 * P(2,2,MP) + AK4 * P(3,3,MP) + 2 * [H * P(1,2,MP) + AK2 * P(1,3,MP) + AK3 * P(2,3,MP)] + BB(0) or BB(9)
P(1,2,MP) = P(1,2,MP) + H * P(1,3,MP) + 2. * AK1 * P(2,3,MP) + H * P(2,2,MP) + AK3 * P(3,3,MP) + BB(1) or BB(10)
P(1,3,MP) = DELTA * [P(1,3,MP) + H * P(2,3,MP) + AK2 * P(3,3,MP)] + BB(2) or BB(11)
P(2,2,MP) = P(2,2,MP) + AK1 * P(3,3,MP) + 2. * H * P(2,3,MP) + BB(4) or BB(13)
P(2,3,MP) = DELTA * [P(2,3,MP) + H * P(3,3,MP)] + BB(5) or BB(14)
P(3,3,MP) = DELTA$^2$ * P(3,3,MP) + BB(8) or BB(17)
where:
DELTA = 1 − HTITC
HTITC = (0.02/Target Time Constant)

BB = process noise covariances
BB(0), BB(1), BB(2), BB(4), BB(5), BB(8) are used for MP = 1 for updating the P matrix for range.
BB(9), BB(10), BB(11), BB(13), BB(14), BB(17) are used for MP = 2 for updating the P matrix for angle.

Then, for either a direct angle pass from decision block 42 or subsequent to the extrapolation of the range and angle covariance matrices of block 141, the product of the matrix relationship as shown in block 143 is established together with the angle errors or residuals in accordance with the following relationships which are the same as those utilized for the range errors in connection with the description of block 120. Thus, for angle errors the block 143 is mechanized as follows:
HTITC = 0.02 * 32/KTTC
For an angle update form the same matrix relationships as defined for the block 120, except use the angle residuals in place of the range residual.
For angle residuals or errors this is mechanized as follows. Calculate:

ZZ = ZE1 + ZE2
PPSIGE = P(1,1,2) + ZZ
For IX = 8, I = 2, II = 2, initially, calculate:
RB(1) = AAEPSEX * YR/PPSIGE
RB(2) = AAEPSEX * YR/PPSIGE
V(1) = −P(1,II,2) * C3(I)
V(2) = P(1,II,2) * C2(I)
RET = RB(1) * V(1) + RB(2) * V(2)
S(IX)$_{NEW}$ = S(IX)$_{OLD}$ + RET
where:
ZE1, ZE2 are as defined a range dependent variable and and a constant velocity to mean square angle measurement error, respectively.
AAEPSEX = elevation angle residual
AAEPSAX = azimuth angle residual
RET = product of angle residuals and the weighting matrix
"IX" is decremented by 1 until 0, after which calculations cease
"I" is decremented by 1 until negative, then reset to 2
"II" is decremented by 1 whenever I is reset to 2.
The previous equations are executed 9 times according to the the following values of IX, I, II:

| IX | I | II |
|---|---|---|
| 8 | 2 | 2 |
| 7 | 1 | 2 |
| 6 | 0 | 2 |
| 5 | 2 | 1 |
| 4 | 1 | 1 |
| 3 | 0 | 1 |
| 2 | 2 | 0 |
| 1 | 1 | 0 |
| 0 | 0 | 0 |

C2, C3 are defined as follows:

$$\begin{bmatrix} 0 & 0 & 0 \\ C2(0) & C2(1) & C2(2) \\ C3(0) & C3(1) & C3(2) \end{bmatrix} = [\lambda_E][\lambda_A][\phi][\theta][\psi_P]$$

where:

$$[\psi_P] = \begin{bmatrix} \cos\psi_P & \sin\psi_P & 0 \\ -\sin\psi_P & \cos\psi_P & 0 \\ 0 & 0 & 1 \end{bmatrix}$$

$$[\theta] = \begin{bmatrix} \cos\theta & 0 & -\sin\theta \\ 0 & 1 & 0 \\ \sin\theta & 0 & \cos\theta \end{bmatrix}$$

$$[\phi] = \begin{bmatrix} 1 & 0 & 0 \\ 0 & \cos\phi & \sin\phi \\ 0 & -\sin\phi & \cos\phi \end{bmatrix}$$

$$[\lambda_E] = \begin{bmatrix} \cos\lambda_E & 0 & -\sin\lambda_E \\ 0 & 1 & 0 \\ \sin\lambda_E & 0 & \cos\lambda_E \end{bmatrix}$$

$$[\lambda_A] = \begin{bmatrix} -\sin\lambda_A & -\cos\lambda_A & 0 \\ -\cos\lambda_A & \sin\lambda_A & 0 \\ 0 & 0 & 1 \end{bmatrix}$$

S(IX)$_{OLD}$ = Those S values from equations in block 114.

Then, this result is added to the S array which resulted from the calculation at block 144. A Fortran listing showing one digital implementation of the estimator on a general purpose computer is included in Appendix A on pages A1 through A9 herein.

Figure 11:
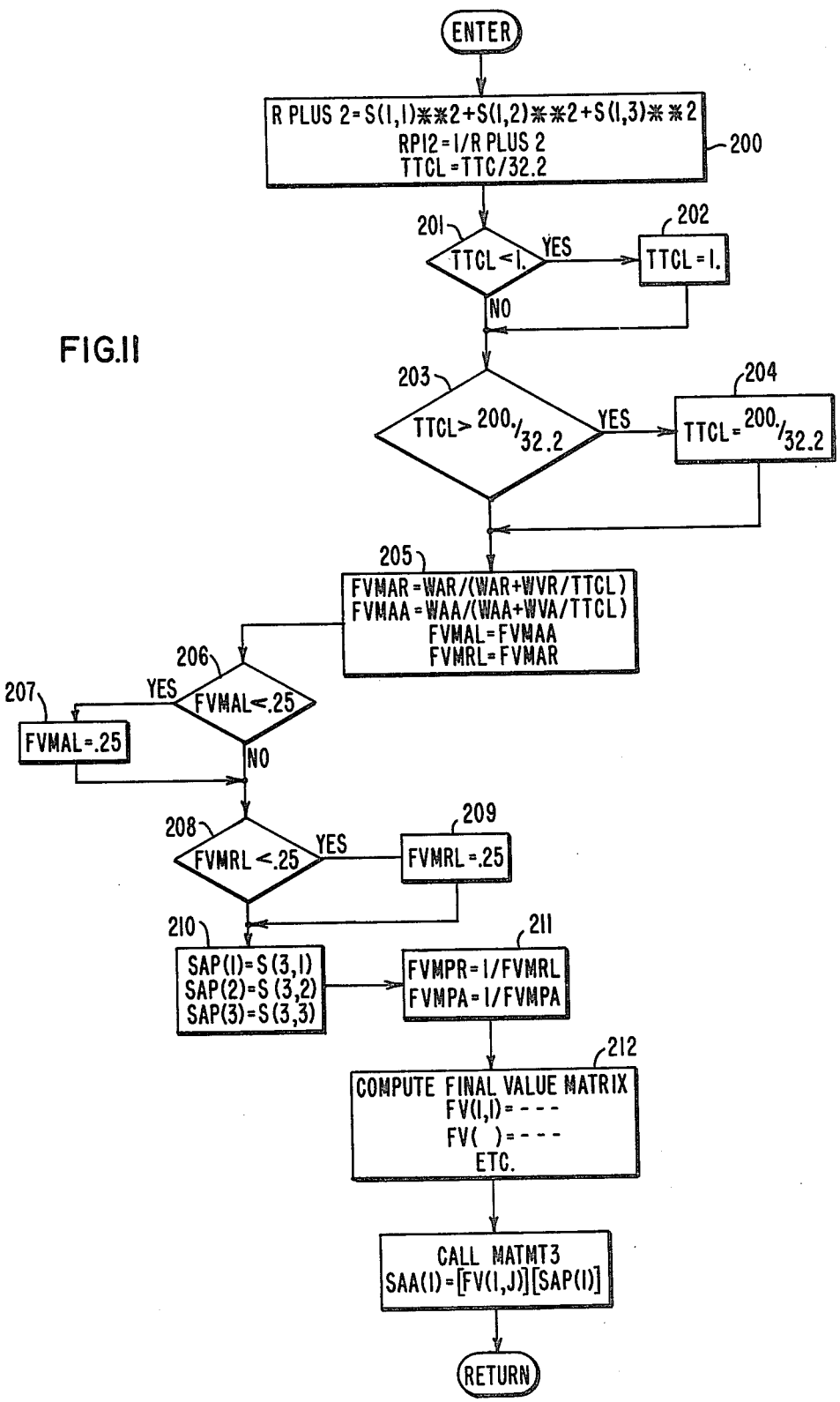
FIG. 11 illustrates a flow chart of the final value compensator according to another embodiment of the invention.

Referring to FIG. 11, is a flow chart of an acceleration compensator FVCOMP according to one embodiment of the invention for a three-dimensional system. This flow chart is appropriately labeled with Fortran statements corresponding to the listing herein for a clearer understanding. Also, such compensation system transforms the modified acceleration data between geographic and line-of-sight coordinates as well as correcting the estimation of acceleration for severely maneuvering targets.

Each time the program FVCOMP is run, the estimates of target position referred to as S(1,1), S(1,2) and S(1,3) are combined as shown in block 200 to obtain a signal corresponding to the square of the estimated range magnitude. This square or range magnitude referred to as RP12 is obtained by squaring the range magnitude of each geographic coordinate N, E, and D, referred to as S(1,1), S(1,2), and S(1,3) respectively, adding the results, and then obtaining the reciprocal of such sum, all as shown in block 200.

Then, the target time constant TTC from the estimator is rescaled to seconds to obtain a value TTCL which is equal to TTC/32.2. The limits of the value TTCl are then obtained by checking at block 201 to see if the time constant is less than 1. If it is, then such value is made equal to 1 at block 202. The time constant is then checked at block 203 to determine if such value is greater than two hundred divided by the value 32.2 or six seconds, for example, and if such is the case, the time constant TTCL is limited to six seconds at block 204. Such limiting insures that the time constant is sufficient for accuracy; and also, that the old data is not being used at the upper limit.

At block 205, an acceleration compensation factor or signal FVMRL for along-range compensation is generated by dividing the estimator or Kalman velocity gain factor for range observation $W_{VR}$ by the time constant TTCL and summing the result with the acceleration gain factor for range observation $W_{AR}$. The gain factor $W_{AR}$ is divided by the aforesaid summed result to obtain the compensation signal FVMRL. Such computation may be expressed in accordance with the following equation:

$$FVMRL = \frac{W_{AR}}{W_{AR} + \frac{W_{VR}}{TTCL}}$$

Also, at block 205 another compensation factor or signal FVMAL for angle compensation is generated by dividing the velocity gain factor for angle acceleration $W_{VA}$ by the time constant TTCL, adding the result to the acceleration gain factor for angle observation $W_{AA}$, and dividing the acceleration gain factor for angle observation $W_{AA}$ by the aforesaid result. This may be expressed in accordance with the following equation:

$$FVMAL = \frac{W_{AA}}{W_{AA} + \frac{W_{VA}}{TTC}}$$

At block 206, the compensation signal FVMAL is checked so that compensation factor will not be an extreme value. If it is an extreme value, then such signal is limited at block 207. Similarly, the compensation signal FVMRL is checked at block 208 and made equal at block 209 if less than a predetermined value. Only one compensation factor FVMAL for angle is utilized because it is considered that the factor for azimuth and elevation are equal.

At block 210, the estimated acceleration states referred to as S(3,1), S(3,2), and S(3,3) formerly referred to as S7, S8 and S9, is provided with a new designator SAP(1), SAP(2), and SAP(3) respectively preparatory to the application of the signals FVMRL and FVMAL. At block 211, the reciprocal of the compensation signals FVMRL and FVMAL are computed and referred to as FVMPR and FVMPA respectively.

At block 212, a final value matrix or array is then computed utilizing the squared range magnitude R plus 2 and the reciprocal RP12, the compensation signal or factor reciprocals FVMPA and FVMPR, and the estimated target positions S(1,1,), S(1,2) and S(1,3) preparatory to the compensated acceleration estimates SAA(I), SAA(II) and SAA(III). The nine element matrix or array is conventionally referred to as FV(1,1), FV(1,2), FV(1,3) . . . FV(3,1), FV(3,2), FV(3,3) and computed for transformation to geographic coordinates to be as follows:

FV(1,1) = RP12 × [(FVMPR) (S(1,1))$^2$ + FVMPA (RPLUS2) − S(1,1)$^2$]

FV(1,2) = RP12 (S(1,1)) (S(1,2)) (FVMPR − FVMPA)

FV(1,3) = RP12 (S(1,1)) (S(1,3)) (FVMRR − FVMPA)

FV(2,2) = RP12 × ](FVMPR) (S(1,2))$^2$ + FVMPA (RPLUS2) − S(1,2)$^2$]

FV(2,3) = RP12 (S(1,2)) (S(1,3)) (FVMPR − FVMPA)

FV(3,3) = RP12 × [(FVMPR) (S(1,3))$^2$ + FVMPA (RPLUS2) − S(1,3)$^2$]

FV(2,1) = FV(1,2)

FV(3,1) = FV(1,3)

FV(3,2) = FV(2,3)

From the above matrix, the estimated acceleration states are then calculated in geographic coordinates as follows:

For North, SAA(I) = FV(1,1) (S(3,1)) + FV(1,2) (S(3,2)) + FV(1,3) (S(3,3))

For East, SAA(II) = FV(2,1) (S(3,1)) + FV(2,2) (S(3,2)) + FV(2,3) (S(3,3)); and finally for the down coordinate,

SAA(III) = FV(3,1) (S(3,1)) + FV(3,2) (S(3,2)) + FV(3,3) (S(3,3))

A Fortran listing showing a digital implementation of the estimator on a general purpose computer is attached as Appendix B hereto.

When the final value theorem is applied to the pertinent transfer functions it is found that the final response of estimated velocity to a unit step in velocity is unity and that the same is true for the unit step response of estimated position. No final value correction is needed except for the acceleration estimate.

In implementing the estimation system and programs described herein as well as other system functions reference is made to a commercially available millicomputer manufactured and sold by Westinghouse Electric Corporation more than one year prior to the filing of this application and described in a publication entitled CP-1138 Millicomputer copyrighted in 1972 by Westinghouse Electric Corporation.

Reference is made to U.S. patent application Ser. No. 672,891 filed Apr. 1, 1976 by Robert I. Heller et al. entitled "Digital Radar Control System And Method"

for further explanation of certain details of the system and the millicomputer referred to herein, which application is incorporated herein by reference.

Reference is also made to U.S. patent application Ser. No. 691,145 filed May 28, 1976, which is a continuation-in-part of Ser. No. 384,337 filed July 31, 1973 by K. S. Etow et al. entitled "Method And System For The Independent Monitoring And Testing Of Computer Controlled Systems", for additional explanation of a computer controlled system, which application is incorporated herein by reference.

In summary, there has been shown and described a radar system including a system described in both analog and digital form for compensating for the attenuation of the acceleration estimate for severely maneuvering targets. The following is a detailed explanation of the formulation involved for the system and method hereinbefore described. Specifically the following explanation describes such compensating system and method for accomplishing such compensation of geographic coordinates in contrast to the previous description of the system and method for compensating the acceleration components in line-of-sight of coordinates with such compensation values being transformed to geographic coordinates for operation of the implementation control system.

A one-dimensional formulation is sufficient to derive the basic transfer functions needed to show the response of the Kalman estimator to inputs of position, velocity and acceleration. Three states $S_p$, $S_v$, and $S_a$ are assumed, which represent position, velocity and acceleration respectively. The states are updated at intervals of T seconds. $S_a$ is decremented by use of a nominal time-constant TTC. The states are propagated in time by equation (C1).

$$\begin{bmatrix} S_p^-(K+1) \\ S_v^-(K+1) \\ S_a^-(K+1) \end{bmatrix} = \begin{bmatrix} 1 & T & \frac{T^2}{2} \\ 0 & 1 & T \\ 0 & 0 & 1 - \frac{T}{TTC} \end{bmatrix} \begin{bmatrix} S_p^+(K) \\ S_v^+(K) \\ S_a^+(K) \end{bmatrix} \quad (C1)$$

The state values corrected for observations in time-step K are designated by positive superscripts. The values extrapolated over the time interval T to step K+1 are designated by a negative superscript. After observations and corrections have been made, a positive superscript is again used.

The one-dimensional formulation can be retained if Kalman gains and the associated quantities observed are expressed in the state domain. Kalman gains $W_p$, $W_v$ and $W_a$ are used for correcting the estimates of position, velocity and acceleration, respectively. For the present example, it is assumed that position, R, is the only variable subject to observation. The observed value $R_m$ is the sum of the true value R and the error E.

The following equation (C2) indicates the use of the observations:

$$\begin{bmatrix} S_p^+(K+1) \\ S_v^+(K+1) \\ S_a^+(K+1) \end{bmatrix} = \begin{bmatrix} S_p^-(K+1) \\ S_v^-(K+1) \\ S_a^-(K+1) \end{bmatrix} + \begin{bmatrix} W_p \\ W_v \\ W_a \end{bmatrix} [R_m(K+1) - S_p^-(K+1)] \quad (C2)$$

By equation (C1), $$S_p^-(K+1) = S_p^+(K) + T S_v^+(K) + \frac{T^2}{2} S_a^+(K) \quad (C3)$$

Substituting equations (C1) and (C3) in equation (C2) results in equation (C4), $$\begin{bmatrix} S_p^+(K+1) \\ S_v^+(K+1) \\ S_a^+(K+1) \end{bmatrix} = \begin{bmatrix} 1 & T & \frac{T^2}{2} \\ 0 & 1 & T \\ 0 & 0 & 1 - \frac{T}{TTC} \end{bmatrix} \begin{bmatrix} S_p^+(K) \\ S_v^+(K) \\ S_a^+(K) \end{bmatrix} +$$

$$\begin{bmatrix} W_p \\ W_v \\ W_a \end{bmatrix} R_m(K+1) - \begin{bmatrix} W_p \\ W_v \\ W_a \end{bmatrix} [S^+(K) + T S_v^+(K) + \frac{T^2}{2} S_a^+(K)]$$

The term at the extreme right in equation (C4) can be expressed as follows:

$$\begin{bmatrix} W_p \\ W_v \\ W_a \end{bmatrix} [S_p^+(K) + T S_v^+(K) + \frac{T^2}{2} S_a(K)] = \quad (C5)$$

$$\begin{bmatrix} W_p & W_p T & W_p \frac{T^2}{2} \\ W_v & W_v T & W_v \frac{T^2}{2} \\ W_a & W_a T & W_a \frac{T^2}{2} \end{bmatrix} \begin{bmatrix} S_p^+(K) \\ S_v^+(K) \\ S_a^+(K) \end{bmatrix}$$

Equation (C4) re-expressed by combining the rightmost term with the first matrix term appears as shown in the following equation:

$$\begin{bmatrix} S_p^+(K+1) \\ S_v^+(K+1) \\ S_a^+(K+1) \end{bmatrix} = \begin{bmatrix} 1-W_p & T(1-W_p) & \frac{T^2}{2}(1-W_p) \\ -W_v & 1-W_v T & T-W_v \frac{T^2}{2} \\ -W_a & -W_a T & 1-\frac{T}{TTC}-W_a \frac{T^2}{2} \end{bmatrix} \begin{bmatrix} S_p^+(K) \\ S_v^+(K) \\ S_a^+(K) \end{bmatrix} + \begin{bmatrix} W_p \\ W_v \\ W_a \end{bmatrix} [R_m(K+1)] \quad (C6)$$

Since all the state variables now have like superscripts, the use of superscripts will be dropped.

When Z-transforms are taken, equation (C6) changes to the following equation:

$$\begin{bmatrix} Z\,S_p(Z) - S_p(O) \\ Z\,S_v(Z) - S_v(O) \\ Z\,S_a(Z) - S_a(O) \end{bmatrix} = \begin{bmatrix} 1-W_p & T(1-W_p) & \frac{T^2}{2}(1-W_p) \\ -W_v & 1-W_v T & T-W_v \frac{T^2}{2} \\ -W_a & -W_a T & 1-\frac{T}{TTC} -W_a\frac{T^2}{2} \end{bmatrix} \begin{bmatrix} S_p(Z) \\ S_v(Z) \\ S_a(Z) \end{bmatrix} + \begin{bmatrix} W_p \\ W_v \\ W_a \end{bmatrix} Z\,R_m(Z) \quad (C7)$$

When the initial value terms are transposed to the right-hand side of equation (C7) and all terms involving subsequent states are on the left, the following equation (C8) results.

$$\begin{bmatrix} Z-1+W_p & -T(1-W_p) & \frac{-T^2}{2}(1-W_p) \\ W_v & Z-1+W_v T-T+W_v\frac{T^2}{2} \\ W_a & W_a T & Z-1+\frac{T}{TTC}+W_a\frac{T^2}{2} \end{bmatrix} \begin{bmatrix} S_p(Z) \\ S_v(Z) \\ S_a(Z) \end{bmatrix} = \begin{bmatrix} S_p(O) + W_p Z R_m(Z) \\ S_v(O) + W_v Z R_m(Z) \\ S_a(O) + W_a Z R_m(Z) \end{bmatrix} \quad (C8)$$

To solve for S(Z) both sides of equation (C8) are multiplied by the inverse of the transition matrix resulting in the following equation:

$$\begin{bmatrix} S_p(Z) \\ S_v(Z) \\ S_a(Z) \end{bmatrix} = \begin{bmatrix} z-1+W_p & -T(1-W_p) & \frac{-T^2}{2}(1-W_p) \\ W_v & z-1+W_v T-T+W_v\frac{T^2}{2} \\ W_a & W_a T & Z-1+\frac{T}{TTC}+W_a\frac{T^2}{2} \end{bmatrix}^{-1} \begin{bmatrix} S_p(O) + W_p Z R_m(Z) \\ S_v(O) + W_v W R_m(Z) \\ S_a(O) + W_a Z R_m(Z) \end{bmatrix} \quad (C9)$$

When the indicated matrix inversion is performed, equation (C9) appears as in the following equation (C10). The determinant of the matrix in equation (C9) is designated as DET in the following equation:

$$\begin{bmatrix} S_p(Z) \\ S_v(Z) \\ S_a(Z) \end{bmatrix} = \frac{1}{DET} \begin{bmatrix} \begin{array}{l} Z^2 + \\ [-2+\frac{T}{TTC}+W_a\frac{T^2}{2}+W_v T]Z \\ +1-\frac{T}{TTC}+W_a\frac{T^2}{2}-W_v T+W_v\frac{T^2}{TTC} \\ -W_v Z + W_v \\ -W_v\frac{T}{TTC} - W_a T \\ -W_a Z + W_a \end{array} & \begin{array}{l} [T-W_p T]Z - T + \frac{T^2}{TTC} \\ +W_p T - W_p\frac{T^2}{TTC} \\ Z^2 + \\ [-2+\frac{T}{TTC}+W_a\frac{T^2}{2}+W_p]Z \\ +1-\frac{T}{TTC}-W_p+W_p\frac{T}{TTC} \\ -W_a T Z \end{array} & \begin{array}{l} [\frac{T^2}{2}-W_p\frac{T^2}{2}]Z \\ +\frac{T^2}{2}-W_p\frac{T^2}{2} \\ [T-W_v\frac{T^2}{2}]Z \\ -T+W_p T \\ Z^2 + \\ [-2+W_v T+W_p]Z \\ +1-W_p \end{array} \end{bmatrix} \begin{bmatrix} S_p(O) + W_p Z R_m(Z) \\ S_v(O) + W_v Z R_m(Z) \\ S_a(O) + W_a Z R_m(Z) \end{bmatrix} \quad (C10)$$

$$DET = Z^3 + [-3 + W_p + W_v T + W_a \frac{T^2}{2} + \frac{T}{TTC}]Z^2 + [3 - 2W_p - W_v T + W_a \frac{T^2}{2} - 2\frac{T}{TTC} + W_v \frac{T^2}{TTC} + W_p \frac{T}{TTC}]Z \quad (C11)$$
$$- 1 + \frac{T}{TTC} + W_p - \frac{W_p T}{TTC}$$

The transfer function to be examined is the response of the acceleration state $S_a(Z)$ to position inputs $R_m(Z)$. From equation (C10), the following equation is obtained by matrix multiplications.

$$S_a(Z) = \{(-W_a Z + W_a)[S_{po} + W_p Z R_m(Z)] + \quad (C12)$$
$$[-W_a TZ][S_{vo} + W_v Z R_m(Z)]$$
$$+ [Z^2 + (-2 + W_v T + W_p)Z + 1 - W_p]$$
$$[S_{ao} + W_a Z R_m(Z)]\} \frac{1}{DET}$$

The partial derivative of $S_a(Z)$ with respect to $R_m(Z)$ is taken.

$$\frac{\delta S_a(Z)}{\delta R_m(Z)} = \frac{1}{DET} Z[-W_a W_p Z + W_a W_p - \quad (C13)$$
$$W_a W_v TZ + W_a Z^2$$
$$+ W_a[-2 + W_v T + W_p]Z + W_a - W_a W_p]$$

Expressing equation (C13) as a transfer function results in the following equation:

$$\frac{S_a(Z)}{R_m(Z)} = \frac{W_a Z (Z-1)^2}{\{Z^3 + [-3 + W_p + W_v T + W_a \frac{T^2}{2} + \frac{T}{TTC}]Z^2 + [3 - 2W_p - W_v T + W_a \frac{T^2}{2} - \frac{2T}{TTC} + \frac{W_v T^2}{TTC} + \frac{W_p T}{TTC}]Z} \quad (C14)$$
$$- 1 + \frac{T}{TTC} + W_p - \frac{W_p T}{TTC}\}$$

Let $R_m(Z)$ be expressed as the result of a unit step in acceleration, where $$R_m(t) = \frac{1}{2} t^2 = \frac{1}{2} (NT)^2 \quad (C15)$$

$$R_m(Z) = \frac{1}{2} T^2 \left[\frac{Z(Z+1)}{(Z-1)^3}\right] \quad (C16)$$

If equation (C16) is substituted into equation (C14), $S_a(Z)$ is obtained as expressed by the following equation (C17).

$S_a(Z)$ (acceleration step response) = (C17)

$$\frac{W_a \frac{T^2}{2} Z^2(Z+1)}{[Z-1][Z^3 + (-3 + W_p + W_v T + W_a \frac{T^2}{2} + \frac{T}{TTC})Z^2 + (3 - 2W_p - W_v T + W_a \frac{T^2}{2} - \frac{2T}{TTC} + W_v \frac{T^2}{TTC} + W_p \frac{T}{TTC})Z}$$
$$-1 + \frac{T}{TTC} + W_p - \frac{W_p T}{TTC}]$$

$$\frac{S_a(Z) \text{ (final value)}}{\text{Unit step in acceleration}} = \frac{W_a}{W_a + \frac{W_v}{TTC}} \quad (C19)$$

To correct the acceleration estimate, $$S_a \text{ (corrected)} = S_a \text{ (attenuated)} \frac{(W_a + \frac{W_v}{TTC})}{W_a} \quad (C20)$$

By the final value theorem $$\lim_{t \to \infty} C(t) = \lim_{Z \to 1} (Z-1) C(Z) \quad (C18)$$

Applying the final value theorem to equation (C17) results in the response of estimated acceleration, $S_a$, to a unit step of sensed acceleration as given by the following equation:

```
C     INITIAL CONSTANTS
C     COM=.017453293
      UNITY=1.
      H = 1./50.
      H33 = H**3/3.
      H2O3 = H**2/3.
      H223 = 2.**H2O3
      H3O8 = H**3/8.
      H4O20 = H**4/20.
      HTITC = H
      AK1 = H*H
      AK2 = AK1/2.
      AK3 = H*AK2
      AK4 = AK2*AK2
```

```
      ETFAC2 = 3.*160.2/5.3
      ETFAC3 = 2000.*6.2/3.H
      Z = H
      ZK2 = Z*Z/2.
      KALM = 53
      KAL1 = 8
      KAL2 = 50
      NODEVN = 0
      IP = 0
      IUP = 0
      KKN= 4
```

C     INITIALIZE STATE VARIABLES S(1,1) THROUGH S(3,3)

```
 2000 CONTINUE
C     READ IN PHFB, ROLL ANGLE
C     READ IN THFB, BODY ELEVATION ANGLE
C     READ IN PSFB, HEADING ANGLE OF BODY
C     COMPUTE SIGMA, ELEVATION ANGLE OF RADAR GIMBAL AXES WITH RESPECT
C     TO BODY AXES
C     READ OWNSHIP SPEED COMPONENTS VFV(1), VFV(2), VFV(3)
C     READ OR COMPUTE SINE(SLAA) AND COSINE(CLAA) ANTENNA AZIMUTH
C     GIMBAL ANGLE
C     READ OR COMPUTE SINE(SLEA) AND COSINE(CLEA) ANTENNA ELEVATION
C     GIMBAL ANGLE
C     ESTABLISH TIME TO RE ENTER THIS BOX(2000)
      TP = TP+1./200.

3000 CONTINUE
      IPS = IP
      IP = IP+1
      LP = LP+1
      HTEMP = FLOAT(LP)/200.

CALL ORTHOG(2,-SIGMA,DT,4,PSTPHT)
      CALL ORTHOG(1,-PHFB,PSTPHT,14,DT)
      CALL ORTHOG(2,-THFB,DT,14,PSTPHT)
      CALL ORTHOG(3,-PSFB,PSTPHT,14,DT)
      BC2(1) = -SLAA
      BC2(2) = CLAA
      BC2(3) = 0.
      BC3(1) = CLAA*SLEA
      BC3(2) = SLAA*SLEA
      BC3(3) = CLEA
      DO 3123 I = 1,3
      C2(I) = DT(I,1)*BC2(1)+DT(I,2)*BC2(2)+DT(I,3)*BC2(3)
      C3(I) = DT(I,1)*BC3(1)+DT(I,2)*BC3(2)+DT(I,3)*BC3(3)
      Q(I) = VFV(I)-VFS(I)
      STEMP(I) = S(1,I)+S(2,I)*HTEMP-0.5*Q(I)*HTEMP+S(3,I)*(HTEMP**2/2.)
 3123 CONTINUE
      YRTEM = SQRT(STEMP(1)**2+STEMP(2)**2+STEMP(3)**2)
      DO 3125 I = 1,3
      SLR(I) = (STEMP(1)*DT(1,1)+STEMP(2)*DT(2,1)+STEMP(3)*DT(3,1)
     1)/YRTEM
 3125 CONTINUE
      IF(IUP.GT.0) GO TO 3124
      I = R/7500.
      IF(I.NE.0) GO TO 3121
      IR = 0
      GO TO 3122
 3121 IR = 1+ALOG(FLOAT(I))/ALOG(2.)
 3122 CONTINUE
      NT = IR-1
      NP1 = 13+2*IR
      NP2 = 15
      NP3 = 17-2*IR
 3124 CONTINUE
      RFAC = 1.
      IF(IR.NE.0) RFAC = 2.**IR

KKNTHR = KKN
      IF(MOD(IPS,KKNTHR).NE.0) GO TO 3595

LP = 0

C     STATE EXTRAPOLATION
      DO 3200 I=1,3
      Q(I)=VFV(I)-VFS(I)
      VFS(I)=VFV(I)
```

```
      3200 CONTINUE
           DO 3400 I=1,3
           S(1,I)=S(1,I)+Z*(S(2,I)-Q(I))+ZK2*S(3,I)
           S(2,I)=S(2,I)+Z*S(3,I)-Q(I)
           S(3,I)=DELTA*S(3,I)
      3400 CONTINUE
           SCRG=S(1,1)**2+S(1,2)**2+S(1,3)**2
           YR=SQRT(SCRG)
C
C          TEST FOR DATA PRESENCE
           IF (MILL.EQ.0) GO TO 9000
           MP=MOD(NODEVN,2)+1
           IUP=IUPASS(MP)
           KODEVN=MOD(NODEVN,4)
C
C          TEST FOR KALMAN MODE - RESTRICTED(CONSTANT P) OR
C                                 UNRESTRICTED(FULL KALMAN)
           IF (IUP.GE.KALM) GO TO 4700
C
      4100 CONTINUE
           IF (IUP.NE.0.AND.IUP.NE.KAL2) GO TO 4400
C
C          RESTRICTED P MATRIX(CONSTANT 'P') MODE
C
C          P INITIAL
      4200 CONTINUE
           ZE2=2.**11
           ZR=2.(NP1-2)-2.(NP1-5)
           DO 4300 I=1,9
           P(I,1,MP)=0.
      4300 CONTINUE
           P(2,2,MP)=2.(NP2-2)-2.(NP2-5)
           P(3,3,MP)=2.(NP3-2)-2.(NP3-5)
           IF (IUP.EQ.KAL2) GO TO 4500
           P(1,1,MP)=2.(NP1-2)-2.(NP1-5)
           GO TO 6000
C
      4400 IF (IUP.NE.KAL1) GO TO 4500
C          SWITCH IN P SUB A
           P(1,1,MP)=0.5*ZR/(1.-0.5)
           P(1,2,MP)=(2.14466*ZR/(1.-0.5))*2.**-NT
           GO TO 6000
C
      4500 IF (IUP.NE.KAL2) GO TO 4600
C          SWITCH IN P SUB B
           P(1,1,MP)=(0.14800*ZR/(1.-0.148))*2.
           P(1,2,MP)=(0.19700*ZR/(1.-0.148))*2.**(2-NT)
           P(1,3,MP)=(0.08756*ZR/(1.-0.148))*2.**(3-2*NT)
           GO TO 6000
C
      4600 IF (IUP.NE.(KALM-1)) GO TO 6000
C          SWITCH TO UNRESTRICTED P MATRIX(FULL KALMAN) MODE
           P(1,1,MP)=2.(NP1-2)-2.(NP1-5)
           P(1,2,MP)=0.
           P(1,3,MP)=0.

P(1,1,2)=P(1,1,1)
           P(1,2,2)=0.
           P(1,3,2)=0.
           P(2,1,2)=0.
           P(2,2,2)=P(2,2,1)
           P(2,3,2)=0.
           P(3,1,2)=0.
           P(3,2,2)=0.
           P(3,3,2)=P(3,3,1)
           IUPASS(MP)=KALM
           ZE2=2.**12
           ZR=2.**12
           GO TO 6000
C
C          UNRESTRICTED P MATRIX(FULL KALMAN) MODE: EXTRAPOLATE P
C
      4700 CONTINUE
C
C          COMPUTE PNEW=PHI*POLD*PHI TRANSPOSE
           DELTA=UN-HTITC
           DELTA2=DELTA**2
           DO 4800 MP=1,2
           P(1,1,MP)=P(1,1,MP)+AK1*P(2,2,MP)+AK4*P(3,3,MP)+2.*(H*P(1,2,MP)+
          *        AK2*P(1,3,MP)+AK3*P(2,3,MP))
           P(1,2,MP)=P(1,2,MP)+H*P(1,3,MP)+AK1*P(2,3,MP)+AK1*P(2,3,MP)+
          *        H*P(2,2,MP)+AK3*P(3,3,MP)
           P(1,3,MP)=DELTA*(P(1,3,MP)+H*P(2,3,MP)+AK2*P(3,3,MP))
           P(2,2,MP)=P(2,2,MP)+AK1*P(3,3,MP)+2.*H*P(2,3,MP)
           P(2,3,MP)=DELTA*(P(2,3,MP)+H*P(3,3,MP))
           P(3,3,MP)=DELTA2*P(3,3,MP)
      4800 CONTINUE
           MP=MOD(NODEVN,2)+1
C
C          ADD ON PLANT NOISE TO PNEW
           ETA2=ETFAC2*UNITY
           ETA3H=ETFAC3
           IF (HTITC-H) 4900,5000,9000
      4900 ETA3F=ETFAC3*HTITC
           ETA3H=ETA3F/H
      5000 CONTINUE
           IF (KODEVN.NE.0) GO TO 5100
           ETA2=ETFAC2*2.**(2*IR)
```

```
     5100 CONTINUE
          BB(1,1)=ETA2*H33+ETA3H*H4D20
          BB(1,2)=ETA2*AK2+ETA3H*H3D8
          BB(1,3)=ETA3H*H223
          BB(2,2)=ETA2*H+ETA3H*H2D3
          BB(2,3)=ETA3H*H
          BB(3,3)=ETA3H
          DO 5500 II=1,3
          DO 5500 JJ=1,3
          IF (II.NE.3) GO TO 5300
          IF (JJ.NE.3) GO TO 5300
          PPLUSB=P(3,3,MP)+BB(3,3)
          IF (PPLUSB.LT.0.75*2.**NP3) GO TO 5300
          P(3,3,MP)=0.75*2.**NP3
     5300 CONTINUE
          P(II,JJ,1)=P(II,JJ,1)+BB(II,JJ)
          P(II,JJ,2)=P(II,JJ,2)+BB(II,JJ)
    C     IF UNDERFLOW ALONG ANY DIAGONAL ELEMENT, REINITIALIZE P MATRIX
          IF (II.NE.JJ) GO TO 5400
          IF (P(II,JJ,1).GT.0.) GO TO 5400
          IF (P(II,JJ,2).GT.0.) GO TO 5400
          IUP=0
          GO TO 4100
     5400 CONTINUE
     5500 CONTINUE
    C
     6000 CONTINUE
          IF (KODEVN.EQ.0) GO TO 7000
          IF (KODEVN.EQ.2) GO TO 7000
    C
    C     RANGE PASS, STATE UPDATE
          RMEAS HAS BEEN READ IN PREVIOUSLY

DELR=(RMEAS-YRTEM)

ZZ=ZR
          DENOM=P(1,1,MP)+ZZ
          DO 6400 I=1,3
          UB(I)=S(1,I)/YR
          CPC(I)=P(1,I,MP)/DENOM
     6400 CONTINUE
          DO 6600 I=1,3
          BIGL=CPC(I)*DELR
          IF (IUP.LT.KALM) BIGL=BIGL*2.**((I-1)*NT-I)
          IF (IUP.LT.KAL2.AND.I.NE.3) BIGL=BIGL*2.**I
          DO 6600 J=1,3
          ULB(I,J)=UB(J)*BIGL
          S(I,J)=S(I,J)+ULB(I,J)
     6600 CONTINUE
    C
          IF (IUP.LT.KALM) GO TO 8000
    C
          GO TO 7600
    C
    C     ANGLE PASS, STATE UPDATE
          EPSEX,EPSAX,PE,PA HAVE BEEN READ IN PREVIOUSLY

ESQRT = SQRT(EPSEX*EPSEX+EPSAX*EPSAX)
          EPLIM = .03
          IF(ESQRT.LT.EPLIM) EPOUT = ESQRT
          IF(ESQRT.GT.EPLIM) EPOUT = 2.*EPLIM-ESQRT
          IF(ESQRT.GT.(1.5*EPLIM)) EPOUT = 0.
          EPSEX = EPOUT*EPSEX/ESQRT
          EPSAX = EPOUT*EPSAX/ESQRT
          PSQRT = SQRT(PE*PE+PA*PA)
          IF(PSQRT.LT.EPLIM) PPOUT = PSQRT
          IF(PSQRT.GT.EPLIM) PPOUT = 2.*EPLIM-PSQRT
          IF(PSQRT.GT.(1.5*EPLIM)) PPOUT = 0.
          PE = PPOUT*PE/PSQRT
          PA = PPOUT*PA/PSQRT
          EPSEX = EPSEX-PE
          EPSAX = EPSAX-PA
    C
     7000 CONTINUE
          ZZ=ZE1+ZE2*2.**(2*IR)
          DENOM=P(1,1,MP)+ZZ
          DO 7200 I=1,3
          VV(I)=(C2(I)*EPSAX-C3(I)*EPSEX)*YR
          XL(I)=P(1,I,MP)/DENOM
     7200 CONTINUE
          NSHIFT=1
          IF (IR.GE.4) NSHIFT=2
          IMX=2
          IF (IR.LT.3) IMX=3
          DO 7400 I=1,IMX
          DO 7400 J=1,3
          V(I,J)=VV(J)*XL(I)
          IF (IUP.LT.KALM) V(I,J)=V(I,J)*2.**((NT-NSHIFT)*(I-1)-NSHIFT)
          S(I,J)=S(I,J)+V(I,J)
     7400 CONTINUE
    C
    C     IF (IUP.LT.KALM) GO TO 8000
    C
```

```
C     P UPDATE
7600  CONTINUE
      P(1,1,MP)=P(1,1,MP)*ZZ/DENOM

P(2,1,MP)=P(1,2,MP)*ZZ/DENOM
      P(3,1,MP)=P(1,3,MP)*ZZ/DENOM
      P(2,2,MP)=P(2,2,MP)-P(1,2,MP)**2/DENOM
      P(3,2,MP)=P(2,3,MP)-P(1,2,MP)*P(1,3,MP)/DENOM
      P(3,3,MP)=P(3,3,MP)-P(1,3,MP)**2/DENOM
      P(1,2,MP)=P(2,1,MP)
      P(1,3,MP)=P(3,1,MP)
      P(2,3,MP)=P(3,2,MP)
      P(2,1,MP)=0.
      P(3,1,MP)=0.
      P(3,2,MP)=0.
C
8000  CONTINUE
      HTITC=H/3.5
      IF (IUP.LT.KALM) GO TO 8400
C     TTC = ARBITRARY COMPUTATION
      IF (TTC.GT.200.) TTC=200.
      HTITC=H
      IF (TTC.LT.32.) GO TO 8400
      HTITC=H*32./TTC
8400  CONTINUE
C
      IF (IR.LT.3.AND.IUP.LT.1000.AND.IUP.GE.(KAL2+1)) IUP=IUP+1
      IF (IUP.LT.(KAL2+1)) IUP=IUP+1
      IUPASS(MP)=IUP
C
C     END OF SIMULATED AIRBORNE COMPUTATIONS
C
9000  CONTINUE
      NODEVN = KODEVN+1
3595  CONTINUE

C     WRITE DESIRED OUTPUT QUANTITIES
C     RETURN TO EXECUTIVE PROGRAM

SUBROUTINE ORTHOG(K,ANGLE,U,KONVRT,T)

REAL A(3,3),U(3,3),T(3,3)
      IF(MOD(KONVRT,2).EQ.1) ANGLE = ANGLE*3.141592654/180.
      CANG = COS(ANGLE)
      SANG = SQRT(1.-CANG**2)
      IF(SIN(ANGLE).LT.0.) SANG = -SANG
      A(1,1) = CANG
      A(2,1) = 0.
      A(3,1) = 0.
      A(1,2) = 0.
      A(2,2) = CANG
      A(3,2) = 0.
      A(1,3) = 0.
      A(2,3) = 0.
      A(3,3) = CANG
      A(K,K) = 1.
      GO TO (100,200,300),K
100   A(2,3) = SANG
      A(3,2) = -SANG
      GO TO 400
200   A(3,1) = SANG
      A(1,3) = -SANG
      GO TO 400
300   A(1,2) = SANG
      A(2,1) = -SANG
400   CONTINUE
      L = MOD(KONVRT,4)
      IF(L.GT.1) GO TO 800
      DO 550 I = 1,3
      DO 550 J = 1,3
      T(I,J) = A(I,J)
550   CONTINUE
      GO TO 1000
800   CALL MATMT3(3,0,KONVRT/8, A,U,T)
1000  RETURN
      END
```

```
      SUBROUTINE MATMT3(L,A,U,T)
      REAL A(3,3),U(3,3),T(3,3),TTM(3)
      DO 30 I = 1,3
      DO 30 J = 1,L
      DO 20 K = 1,3
      TTM(K) = A(J,K)*U(K,J)
      T(I,J) = TTM(1)+TTM(2)+TTM(3)
   30 CONTINUE
      RETURN
      END
      SUBROUTINE FVCOMP(S,SAA)
      COMMON/FVCMP1/TTCL,WVR,WVA,WAR,WAA
      DIMENSION FV(3,3),SAP(3),S(3,3),SAA(3)
C
C     INPUT ACCELERATION STATES, S(3,1),S(3,2),S(3,3)
C     INPUT KALMAN VELOCITY GAIN FACTORS IN RANGE,ANGLE, WVR,WVA
C     INPUT KALMAN ACCELERATION GAIN FACTORS IN RANGE,ANGLE, WAR,WAA
C     INPUT TARGET TIME CONSTANT,TTC
C     COMPUTE COMPENSATION FACTORS,FVMAR,FVMAA
C     COMPUTE COMPENSATION MATRIX, FV
C     MULTIPLY ACCELERATION STATES BY FV MATRIX
C     CORRECTED ACCELERATION STATES ARE SAA(1),SAA(2),SAA(3)
C
      RPLUS2 = S(1,1)**2+S(1,2)**2+S(1,3)**2
      RPI2 = 1./RPLUS2
      IF(TTCL.LT.1.) TTCL = 1.
      IF(TTCL.GT.200./32.2) TTCL = 200./32.2
      FVMAR = WAR/(WAR+WVR/TTCL)
      FVMAA = WAA/(WAA+WVA/TTCL)
      FVMAL = FVMAA
      IF(FVMAA.LT..25) FVMAL = .25
      FVMRL = FVMAR
      IF(FVMAR.LT..25) FVMRL = .25
      SAP(1) = S(3,1)
      SAP(2) = S(3,2)
      SAP(3) = S(3,3)
      FVMPR = 1./FVMRL
      FVMPA = 1./FVMAL
      FV(1,1) = RPI2*(FVMPR*S(1,1)**2+FVMPA*(RPLUS2-S(1,1)**2))
      FV(1,2) = RPI2*S(1,1)*S(1,2)*(FVMPR-FVMPA)
      FV(1,3) = RPI2*S(1,1)*S(1,3)*(FVMPR-FVMPA)
      FV(2,1) = FV(1,2)
      FV(2,2) = RPI2*(FVMPR*S(1,2)**2+FVMPA*(RPLUS2-S(1,2)**2))
      FV(2,3) = RPI2*S(1,2)*S(1,3)*(FVMPR-FVMPA)
      FV(3,1) = FV(1,3)
      FV(3,2) = FV(2,3)
      FV(3,3) = RPI2*(FVMPR*S(1,3)**2+FVMPA*(RPLUS2-S(1,3)**2))
      CALL MATMT3 (1,FV,SAP,SAA)
      RETURN
      END
```

I claim:

1. A radar system for tracking a moving target, comprising:
   (a) antenna means for sensing radar pulses reflected from the moving target;
   (b) means responsive to the reflected pulses to generate a signal representative of the measured target range and a signal representative of the measured angle of error between the antenna line-of-sight and the target;
   (c) means to generate estimation gain factor signals to compensate for external and internal radar system errors, said gain factor signals being derived from signals representative of errors in measuring target range, target velocity, and target acceleration;
   (d) estimating means governed by the generated measured signals and the generated gain factor signals to generate repetitive signals representative of estimated target range, estimated rate of change of target range, and estimated target acceleration, said target acceleration estimation signal being generated in accordance with the value of a selected number of previously generated estimated acceleration signals;
   (e) means to decrement each of the selected number of previously generated estimated acceleration signals a proportional amount in calculating the value of the present estimated acceleration signal; and
   (f) compensating means to increase the value of the estimated target acceleration signal to compensate for the attenuation of the previously decremented acceleration estimation signals in accordance with a signal representative of the selected number of previously generated estimation signals and the generated gain factor signals representative of target velocity and acceleration, whereby the increased acceleration signal represents a more accurate representation of a severely maneuvering target.

2. A radar system according to claim 1 wherein the compensating means includes means to multiply the estimated target acceleration signal by $1 + W_V/W_{A(TTC)}$ to generate the increased estimation signal, where $W_V$ is the gain factor representative of target velocity, $W_A$ is the gain factor representative of target acceleration and TTC is a value representative of the selected number of previously generated estimation acceleration signals.

3. A radar system according to claim 1 further including means governed by the signal representative of estimated acceleration to select the number of previously generated estimated acceleration signals.

4. A system according to claim 2 wherein the means to generate estimation gain factor signals includes means to generate said signals for each of the axes of an earth coordinate system.

5. A system according to claim 4 wherein the means to generate the estimation gain factor signals includes means to generate said signals in accordance with the following equations:

$$W_A = \sqrt{W_{AN}^2 + W_{AE}^2 + W_{AD}^2}$$

$$W_V = \sqrt{W_{VN}^2 + W_{VE}^2 + W_{VD}^2}$$

where $W_{AN}$, $W_{AE}$, $W_{AD}$ are the estimation gain factors for target acceleration in the north, east and down axes respectively, $W_{VN}$, $W_{VE}$, $W_{VD}$ are the estimation gain factors for target velocity in the north, east and down axes, respectively, $$S_{AN} = S_{AN}^+(k) \frac{(W_A + \frac{W_V}{TTC})}{W_A}$$

$$S_{AE} = S_{AE}^+(k) \frac{(W_A + \frac{W_V}{TTC})}{W_A}$$

$$S_{AD} = S_{AD}^+(k) \frac{(W_A + \frac{W_V}{TTC})}{W_A}$$

where the superscript + indicates that a measured quantity has just been applied and K refers to a previous step, and $S_{AN}$, $S_{AE}$, and $S_{AD}$ refer to the corrected estimated of acceleration for the north, east, and down axes, respectively.

6. In a radar system having an estimator for generating signals representative of the estimated velocity and acceleration of a target, said signal of estimated acceleration being generated in accordance with a selected number of previously generated estimated acceleration signals, wherein each of the selected number of previously generated estimated acceleration signals are decremented by a value in accordance with the total selected number to calculate each new estimated acceleration signal, said estimator generating estimator gain factor, velocity and acceleration signals to compensate for external and internal system noise, the method of compensating for the decrementing of each of the previously generated signals in the generation of each new estimated acceleration signal comprising:
generating a signal TTC representative of the selected number of previously generated signals,
dividing the velocity gain factor signal by the generated signal TTC,
adding the result of the last previous step to the acceleration gain factor signal,
dividing the acceleration gain factor signals by the result of the last previous step to obtain the acceleration compensation factor signals, and
multiplying the acceleration compensation factor signal by the estimated acceleration signal.

7. A method according to claim 6 further comprising the step of:
transforming effectively the estimated acceleration signals from geographic to line-of-sight coordinates, and transforming effectively the product of the estimated acceleration signals and the acceleration compensation factor signals from the line-of-sight to geographic coordinates.

8. A radar system for tracking a moving target, comprising:
(a) antenna means for sensing radar pulses reflected from the moving target;
(b) means responsive to the reflected pulses to generate a signal representative of the measured target range and a signal representative of the measured angle of error between the effective antenna line-of-sight and the target;
(c) means to generate estimation gain factor signals for effective line-of-sight coordinates to compensate for external and internal radar system errors, said gain factor signals including signals representative of errors in measuring target range, target velocity, and target acceleration;
(d) estimating means governed by the generated measured signals and the generated gain factor signals to generate repetitive signals representative of estimated target range, estimated rate of change of target range, and estimated target acceleration, said target acceleration estimation signal being generated in accordance with the value of a selected number of previously generated estimated acceleration signals;
(e) means to decrement each of the selected number of previously generated estimated acceleration signals a proportional amount in calculating the value of the present estimated acceleration signal;
(f) compensating means to increase the value of the estimated target acceleration signal to compensate for the attenuation of the previously decremented acceleration estimation signals for the effective line-of-sight coordinates in accordance with a signal representative of the selected number of previously generated estimation signals and the generated gain factor signals representative of target velocity and acceleration; and
(g) means to effectively change the increased estimated target acceleration signals to values for geographic coordinates.

9. A radar system according to claim 8 wherein the compensating means includes means to multiply the estimated target acceleration signal by 1 + $W_{VR}/W_{AR(TTC)}$ to generate the increased estimation signal for estimated acceleration in the direction of a range vector, and wherein the compensating means further includes means to multiply the estimated target acceleration by 1 + $W_{VA}/W_{AA(TTC)}$ to generate the increased estimation signal for estimated acceleration normal to the direction of the range vector, where $W_{VR}$ is the gain factor representative of target velocity range measurement, $W_{AR}$ is the gain factor representative of target acceleration range measurement, $W_{VA}$ is the gain factor representative of velocity for angle measurement, $W_{AA}$ is the gain factor for acceleration for angle measurement, and TTC is a value representative of the selected number of previously generated estimation acceleration signals.

10. A radar system according to claim 8 further including means governed by the signal representative of estimated acceleration to select the number of previously generated estimated acceleration signals.

* * * * *